US012791856B2

(12) United States Patent
Tso et al.

(10) Patent No.: US 12,791,856 B2
(45) Date of Patent: Nov. 10, 2026

(54) HEAD-UP DISPLAY GLASS AND HEAD-UP DISPLAY SYSTEM THEREOF

(71) Applicant: FUYAO GLASS INDUSTRY GROUP CO., LTD., Fuqing (CN)

(72) Inventors: Fai Tso, Fuqing (CN); Guofu Chen, Fuqing (CN); Guoshui Lu, Fuqing (CN); Gaoqiang Lin, Fuqing (CN); Lishan He, Fuqing (CN); Kohta Fukuhara, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 283 days.

(21) Appl. No.: 18/596,021

(22) Filed: Mar. 5, 2024

(65) Prior Publication Data

US 2024/0210688 A1 Jun. 27, 2024

Related U.S. Application Data

(63) Continuation of application No. PCT/CN2022/126733, filed on Oct. 21, 2022.

(30) Foreign Application Priority Data

Oct. 21, 2021 (CN) ......................... 202111230958.6

(51) Int. Cl.

*G02B 27/01* (2006.01)
*C03C 17/34* (2006.01)
*G02B 1/11* (2015.01)

(52) U.S. Cl.

CPC ...... *G02B 27/0101* (2013.01); *C03C 17/3417* (2013.01); *G02B 1/11* (2013.01);

(Continued)

(58) Field of Classification Search

CPC .................. G02B 27/0101; G02B 1/11; G02B 2027/0194; C03C 17/3417; C03C 2217/734; C03C 2218/33

(Continued)

(56) References Cited

U.S. PATENT DOCUMENTS 5,066,102 A * 11/1991 Hirano ................. G02B 5/0808 428/428
2010/0078808 A1* 4/2010 Burch ................. H10W 70/614 438/106

(Continued)

FOREIGN PATENT DOCUMENTS

CN 103198203 A * 7/2013
CN 104267498 A 1/2015

(Continued)

OTHER PUBLICATIONS

International Search Report dated Jan. 3, 2023 issued in PCT/CN2022/126733.

(Continued)

*Primary Examiner* — Pinping Sun
*Assistant Examiner* — Andrew R Wright
(74) *Attorney, Agent, or Firm* — Scully, Scott, Murphy & Presser, P.C.

(57) ABSTRACT

Head-up display glass is provided. The head-up display glass includes laminated glass that has a first surface and a second surface opposite to the first surface. The second surface includes a display region and a non-display region. A first nano-coating disposed in the display region includes at least one first high-refractive-index layer and at least one first low-refractive-index layer that are alternately stacked. Each first high-refractive-index layer has a refractive index ranging from 1.9 to 2.7. Each first low-refractive-index layer has a refractive index ranging from 1.3 to 1.8. The display (Continued)

region has a reflectivity greater than or equal to 10% for P-polarized light incident at an angle ranging from 55° to 75°. For visible light incident at an angle ranging from 0° to 10°, a reflectivity of the non-display region is less than a reflectivity of the display region. A head-up display system is further provided.

18 Claims, 9 Drawing Sheets

(52) U.S. Cl.
CPC .... *C03C 2217/734* (2013.01); *C03C 2218/33* (2013.01); *G02B 2027/0194* (2013.01)

(58) Field of Classification Search
USPC .......................................................... 359/630
See application file for complete search history.

(56) References Cited

U.S. PATENT DOCUMENTS

| | | | | |
|---|---|---|---|---|
| 2017/0242247 | A1* | 8/2017 | Tso | B32B 17/10036 |
| 2018/0017789 | A1* | 1/2018 | Aoki | G02B 27/01 |
| 2018/0277610 | A1* | 9/2018 | Kubota | H10K 50/844 |
| 2020/0096854 | A1* | 3/2020 | Schiavoni | B32B 17/1022 |
| 2020/0101692 | A1* | 4/2020 | Hart | C03C 17/3435 |
| 2020/0156992 | A1* | 5/2020 | Baloukas | C03C 17/225 |
| 2022/0087357 | A1* | 3/2022 | Lim | G03B 21/14 |
| 2022/0334300 | A1 | 10/2022 | Sadakane et al. | |

FOREIGN PATENT DOCUMENTS

| | | | | |
|---|---|---|---|---|
| CN | 104267499 | A | 1/2015 | |
| CN | 108973608 | A | 12/2018 | |
| CN | 209368167 | U | 9/2019 | |
| CN | 113071165 | A | 7/2021 | |
| CN | 113238377 | A * | 8/2021 | G02B 27/0101 |
| DE | 102019210952 | B3 | 11/2019 | |
| JP | H0245829 | U | 3/1990 | |
| JP | 2017538141 | A | 12/2017 | |
| JP | 2020520336 | A | 7/2020 | |
| WO | 2020094423 | A1 | 5/2020 | |
| WO | WO-2021145387 | A1 * | 7/2021 | G02B 5/3066 |
| WO | WO-2021219285 | A1 * | 11/2021 | B60K 35/23 |

OTHER PUBLICATIONS

Chinese First Office Action dated Jun. 2, 2022 issued in CN 202111230958.6.
Chinese Second Office Action dated Nov. 29, 2022 issued in CN 202111230958.6.
Notice of Refuse dated May 27, 2023 issued in CN 202111230958.6.
Notice of Reasons for Refusal issued in corresponding JP application No. 2024515374 dated Feb. 12, 2025.
Extended European search report issued in corresponding European application No. 22882983.4 dated Mar. 4, 2025.

* cited by examiner

HEAD-UP DISPLAY GLASS AND HEAD-UP DISPLAY SYSTEM THEREOF

CROSS-REFERENCE TO RELATED APPLICATION(S)

This application is a continuation of International Application No. PCT/CN2022/126733, filed Oct. 21, 2022, which claims priority to Chinese Patent Application No. 202111230958.6, filed Oct. 21, 2021, the entire disclosures of which are incorporated herein by reference.

TECHNICAL FIELD

This disclosure relates to the field of head-up display technology, and in particular to head-up display glass and a head-up display system thereof.

BACKGROUND

Head-up display (HUD) is widely used in vehicles. In vehicle-mounted head-up display systems, important driving information is reflected on front windshields by the principle of optical reflection.

SUMMARY

In a first aspect of the present disclosure, head-up display glass is provided in the present disclosure. The head-up display glass includes laminated glass. The laminated glass has a first surface and a second surface opposite to the first surface. The second surface includes a display region and a non-display region. A first nano-coating is disposed in the display region. The first nano-coating includes at least one first high-refractive-index layer and at least one first low-refractive-index layer that are alternately stacked from the second surface outwards. The at least one first high-refractive-index layer each has a refractive index ranging from 1.9 to 2.7. The at least one first low-refractive-index layer each has a refractive index ranging from 1.3 to 1.8. The display region has a reflectivity greater than or equal to 10% for P-polarized light incident at an angle ranging from 55° to 75°. For the visible light incident at an angle ranging from 0° to 10°, a reflectivity of the non-display region is less than a reflectivity of the display region.

In a second aspect, a head-up display system is provided in the present disclosure. The head-up display system includes a projection unit and a head-up display glass. The head-up display glass includes laminated glass. The laminated glass has a first surface and a second surface opposite to the first surface. The second surface includes a display region and a non-display region. A first nano-coating is disposed in the display region. The first nano-coating includes at least one first high-refractive-index layer and at least one first low-refractive-index layer that are alternately stacked from the second surface outwards. The at least one first high-refractive-index layer each has a refractive index ranging from 1.9 to 2.7. The at least one first low-refractive-index layer each has a refractive index ranging from 1.3 to 1.8. The display region has a reflectivity greater than or equal to 10% for P-polarized light incident at an angle ranging from 55° to 75°. For the visible light incident at an angle ranging from 0° to 10°, a reflectivity of the non-display region is less than a reflectivity of the display region. The projection unit is configured to produce P-polarized light. The P-polarized light is incident onto the display region.

DETAILED DESCRIPTION

Figure 1:
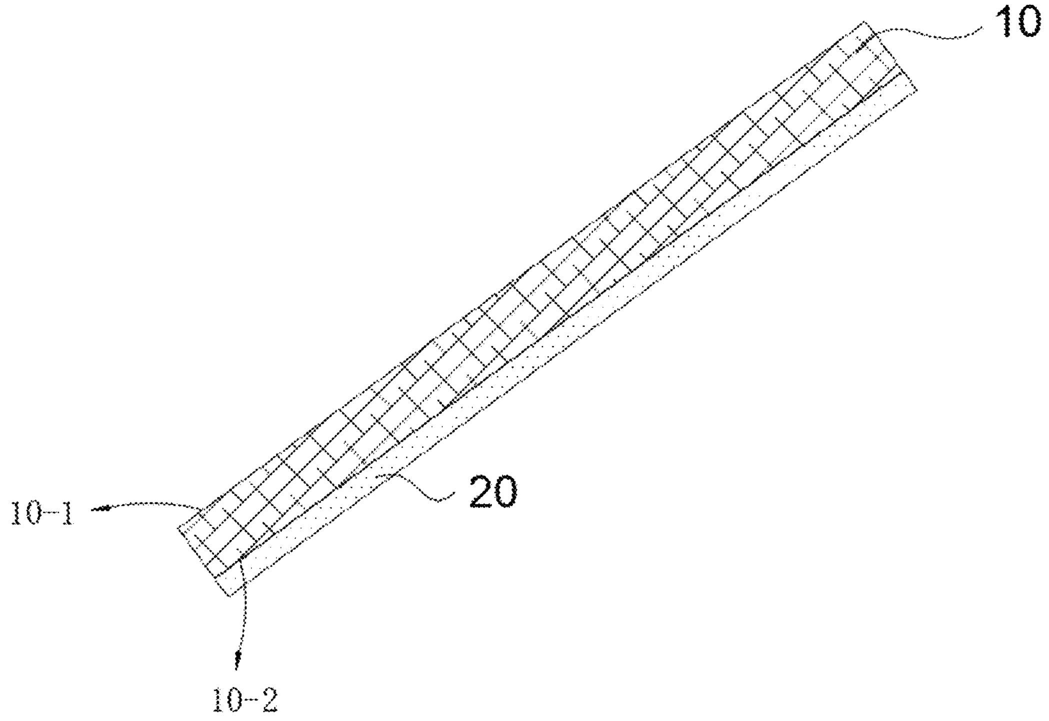
FIG. 1 is a schematic structural view of head-up display glass provided in an implementation of the present disclosure.

Technical solutions of embodiments of the present disclosure will be described clearly and completely below with reference to accompanying drawings in embodiments of the present disclosure. Apparently, embodiments described herein are merely some embodiments, rather than all embodiments, of the present disclosure. Based on embodiments of the present disclosure, all other embodiments obtained by those of ordinary skill in the art without creative effort shall fall within the protection scope of the present disclosure.

In an existing front windshield, a polyvinyl butyral (PVB) layer with a wedge-shaped structure is often used as the middle layer of the front windshield to realize functions of the head-up display. However, a manufacturing process of the PVB layer with the wedge-shaped structure is complex, expensive, and has poor applicability, and different specifications of PVB layers are needed for different vehicle models. Therefore, it is necessary to provide a new type of head-up display glass to solve problems of high cost and poor applicability of the existing head-up display glass.

In view of this, head-up display glass is provided in the present disclosure. For the head-up display glass, not only the cost is low, but also an image of head-up display is sharp and a visual interference of the glass is small, thereby ensuring driving safety and driving comfort during driving.

In a first aspect of the present disclosure, head-up display glass is provided in the present disclosure. The head-up display glass includes laminated glass. The laminated glass has a first surface and a second surface opposite to the first surface. The second surface includes a display region and a non-display region. A first nano-coating is disposed in the display region. The first nano-coating includes at least one first high-refractive-index layer and at least one first low-refractive-index layer that are alternately stacked from the second surface outwards. The at least one first high-refractive-index layer each has a refractive index ranging from 1.9 to 2.7. The at least one first low-refractive-index layer each has a refractive index ranging from 1.3 to 1.8. The display region has a reflectivity greater than or equal to 10% for P-polarized light incident at an angle ranging from 55° to 75°. For the visible light incident at an angle ranging from 0° to 10°, a reflectivity of the non-display region is less than a reflectivity of the display region.

For the head-up display glass in the present disclosure, the nano coating is disposed in the display region, so that the display region has the relatively high reflectivity for the P-polarized light, thereby ensuring the display region to present a sharp image. For the visible light incident at the angle ranging from 0° to 10°, the reflectivity of the non-display region is less than the reflectivity of the display region. Therefore, under this design, a mirror effect of the non-display region can be weakened, a visual interference of reflection of the non-display region can be reduced, and the safety and comfort can be ensured during driving.

Optionally, for the visible light incident at the angle ranging from 0° to 10°, a difference between the reflectivity of the display region and the reflectivity of the non-display region is greater than or equal to 2%.

Optionally, for the visible light incident at the angle ranging from 0° to 10°, the reflectivity of the display region ranges from 10% to 30%.

Optionally, for the visible light incident at the angle ranging from 0° to 10°, the reflectivity of the non-display region ranges from 1% to 15%.

Optionally, for the P-polarized light incident at the angle ranging from 55° to 75°, a reflectivity of the non-display region is less than the reflectivity of the display region.

Optionally, the second surface further includes a transition region located between the display region and the non-display region. For the visible light incident at the angle ranging from 0° to 10°, a reflectivity of the transition region is greater than the reflectivity of the non-display region and less than the reflectivity of the display region.

Optionally, the non-display region is bare laminated glass.

Optionally, a second nano-coating is disposed in the non-display region. The second nano-coating includes at least one second high-refractive-index layer and at least one second low-refractive-index layer that are alternately stacked from the second surface outwards. The at least one second high-refractive-index layer each has a refractive index ranging from 1.9 to 2.7. The at least one second low-refractive-index layer each has a refractive index ranging from 1.3 to 1.8. A thickness of the second nano-coating is smaller than a thickness of the first nano-coating.

Optionally, a thickness of each of the at least one second high-refractive-index layer is smaller than a thickness of each of the at least one first high-refractive-index layer.

Optionally, a thickness of each of the at least one second low-refractive-index layer is smaller than a thickness of each of the at least one first low-refractive-index layer.

Optionally, the at least one first low-refractive-index layer each includes at least two first low-refractive-index sub-layers. The at least one second low-refractive-index layer each includes at least two second low-refractive-index sub-layers. A thickness of a first low-refractive-index sub-layer of each of the at least one first low-refractive-index layer farthest from the laminated glass is larger than a thickness of a second low-refractive-index sub-layer of each of the at least one second low-refractive-index layer farthest from the laminated glass.

Optionally, the at least one first high-refractive-index layer each includes at least two first high-refractive-index sub-layers. The at least one second high-refractive-index layer each includes at least two second high-refractive-index sub-layers. A thickness of a first high-refractive-index sub-layer of each of the at least one first high-refractive-index layer closest to the laminated glass is larger than a thickness of a second high-refractive-index sub-layer of each of the at least one second high-refractive-index layer closest to the laminated glass.

Optionally, a color of each of the display region and the non-display region has a value of a less than or equal to 2 and a value of b less than or equal to 2 in a color space Lab.

Optionally, an absolute value of a difference between a value of a of a color of the display region and a value of a of a color of the non-display region is less than or equal to 2. An absolute value of a difference between a value of b of the color of the display region and a value of b of the color of the non-display region is less than or equal to 2.

Optionally, the head-up display glass further includes one or more of an anti-fingerprint coating, a thermal insulation coating, an electric heating coating, an anti-ultraviolet (UV) coating, or an anti-fog coating.

Optionally, a second nano-coating is disposed in the non-display region. The second nano-coating includes at least one second high-refractive-index layer and at least one second low-refractive-index layer that are alternately stacked from the second surface outwards. The at least one second high-refractive-index layer each has a refractive index ranging from 1.9 to 2.7. The at least one second low-refractive-index layer each has a refractive index ranging from 1.3 to 1.8. The second nano-coating is different from the first nano-coating.

Optionally, the second nano-coating and the first nano-coating are different in at least one of a material of each layer, an arrangement of each layer, or a thickness of each layer.

Optionally, the second nano-coating and the first nano-coating are the same in a material of each layer and an arrangement of each layer, and are different in a thickness of at least one layer.

Optionally, the first nano-coating or the second nano-coating is manufactured by a coating removal method or a non-uniform coating method. The coating removal method includes one or more of a dry etching method, a wet etching method, or a mask method.

Optionally, the first nano-coating is obtained by forming a second nano-coating in the display region and the non-display region first, removing the second nano-coating in the display region by a coating removal method, and then forming the first nano-coating in the display region; or the second nano-coating is obtained by forming a first nano-coating in the display region and the non-display region first, removing the first nano-coating in the non-display region by the coating removal method, and then forming the second nano-coating in the non-display region.

In a second aspect, a head-up display system is provided in the present disclosure. The head-up display system includes a projection unit and the head-up display glass in the first aspect. The projection unit is configured to produce P-polarized light. The P-polarized light is incident onto the display region.

For the head-up display system provided in the second aspect of the present disclosure, the head-up display glass in the present disclosure is employed, so that the image is sharp, the visual interference is less, and there are relatively high safety and comfort.

For ease of understanding, some terms in the present disclosure are explained as follows. A refractive index refers to a refractive index of a material when a wavelength of transmitting light is 550 nm. A reflectivity for visible light refers to a reflectivity for visible light incident at an angle ranging from 0° to 10° (that is, normal incidence). From the second surface outwards refers to a direction from the second surface of the laminated glass to being away from a laminated-glass body.

Figure 2:
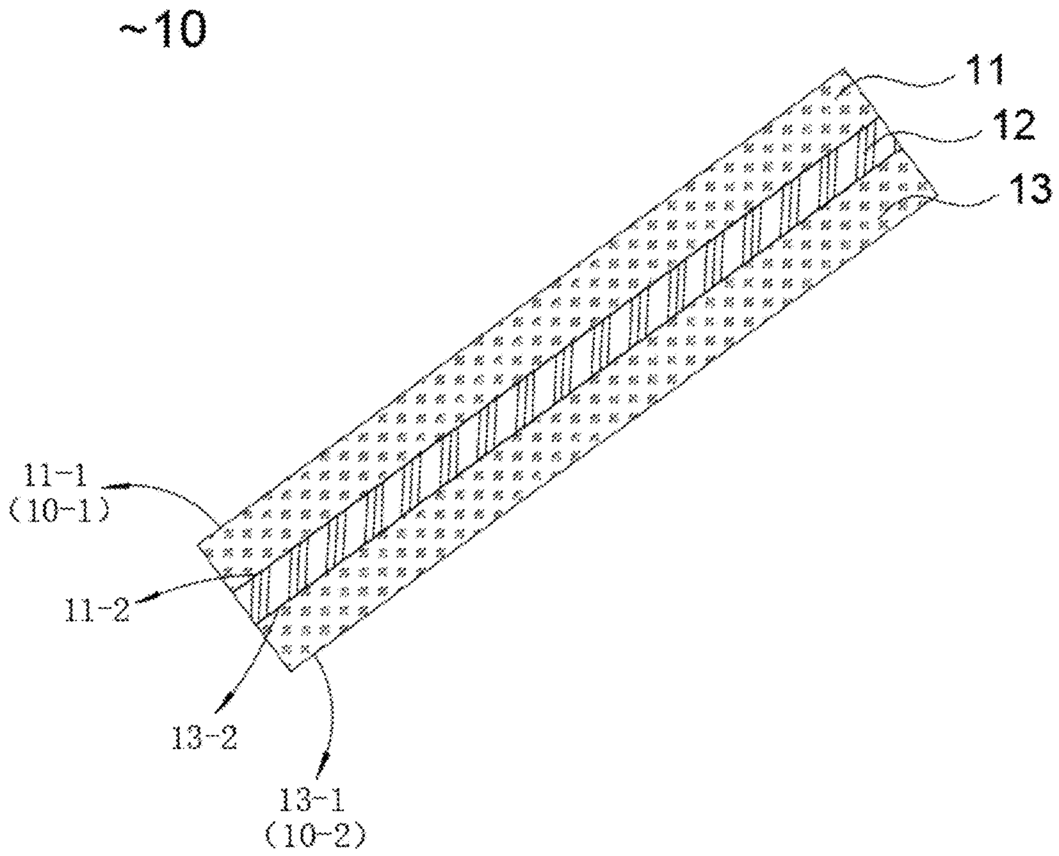
FIG. 2 is a schematic structural view of laminated glass provided in an implementation of the present disclosure.

Reference can be made to FIG. 1, which is a schematic structural view of head-up display glass provided in an implementation of the present disclosure. The head-up display glass includes laminated glass 10. The laminated glass 10 has a first surface 10-1 and a second surface 10-2 opposite to the first surface 10-1. The laminated glass 10 is provided with a nano coating 20 on the second surface 10-2 of the laminated glass 10. Reference can be made to FIG. 2, which is a schematic structural view of laminated glass provided in an implementation of the present disclosure. The laminated glass 10 includes an outer glass plate 11, an inner glass plate 13, and an intermediate layer 12 disposed between the outer glass plate 11 and the inner glass plate 13. The outer glass plate 11 has a first surface 11-1 and a second surface 11-2. The first surface 11-1 of the outer glass plate 11 is the first surface 10-1 of the laminated glass 10. The inner glass plate 13 has a first surface 13-1 and a second surface 13-2. The first surface 13-1 of the inner glass plate 13 is the second surface 10-2 of the laminated glass 10. The second surface 11-2 of the outer glass plate 11 and the second surface 13-2 of the inner glass plate 13 are bonded and fixed to two surfaces of the intermediate layer 12, respectively. When the head-up display glass in the present disclosure is used, the first surface 13-1 of the inner glass plate 13 is located inside a vehicle window (e.g., inside a vehicle). In other words, the second surface 10-2 of the laminated glass 10 is located inside the vehicle window. The first surface 11-1 of the outer glass plate 11 is located outside the vehicle window (outside the vehicle). In other words, the first surface 10-1 of the laminated glass 10 is located outside the vehicle window. In implementations of the present disclosure, the nano coating 20 is disposed on the first surface 13-1 of the inner glass plate 13.

Figure 3:
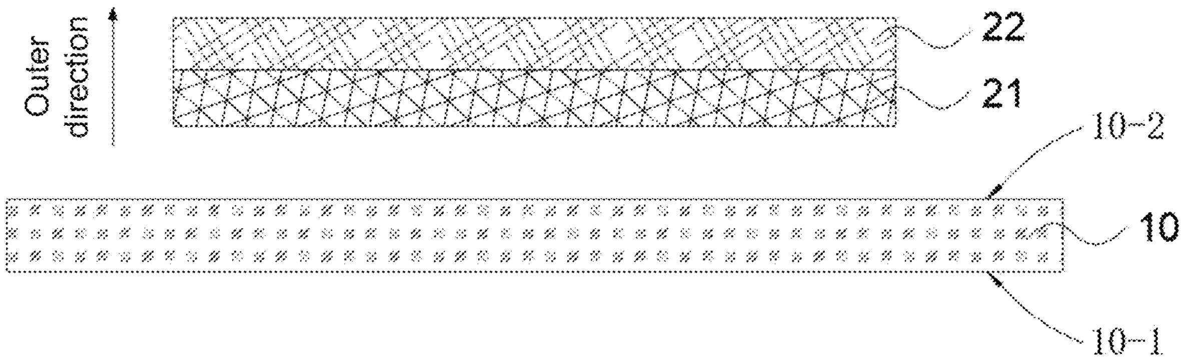
FIG. 3 is a schematic structural view of a nano coating provided in an implementation of the present disclosure.

In implementations of the present disclosure, the nano coating includes at least one high refractive-index layer and at least one low refractive-index layer that are alternately stacked. The at least one high refractive-index layer each has a refractive index greater than or equal to 1.9. The at least one low refractive-index layer each has a refractive index less than or equal to 1.8. Reference can be made to FIG. 3, which is a schematic structural view of a nano coating provided in an implementation of the present disclosure. In the head-up display glass, the nano coating 20 includes a high refractive-index layer 21 and a low refractive-index layer 22 that are alternately stacked in an outer direction. The outer direction refers to a direction from the second surface of the laminated glass to the outside. By adopting the nano coating with the above structure, good light transmittance of the head-up display glass can be satisfied, and the reflectivity of the head-up display glass for the P-polarized light can be effectively improved, so that sharpness of the image is improved.

Figure 4:
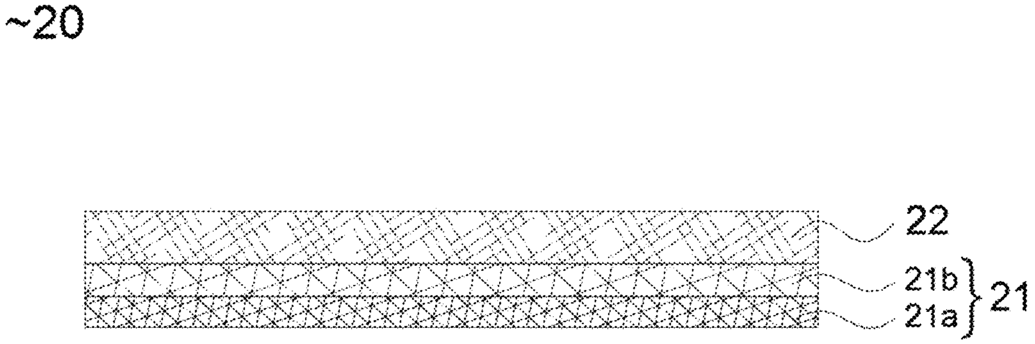
FIG. 4 is a schematic structural view of a nano coating provided in another implementation of the present disclosure.

In implementations of the present disclosure, the high refractive-index layer includes a high refractive-index material. A refractive index of the high refractive-index material is greater than or equal to 1.9. The refractive index of the high refractive-index material may be, but is not limited to, 1.9, 2.0, 2.1, 2.2, 2.3, 2.4, 2.5, 2.6, 2.7, or greater. By reasonably designing the material and thickness of the high refractive-index layer, the nano coating can have excellent mechanical stability, chemical stability, and thermal stability, and thereby ensuring that the nano coating has a long service life. Besides, the reflectivity of the nano coating for the P-polarized light can be further improved, and other optical indexes can be optimized. In some implementations of the present disclosure, the refractive index of the high refractive-index material may range from 1.9 to 2.7. In some implementations of the present disclosure, the high refractive-index layer includes multiple high refractive-index sub-layers. The multiple high refractive-index sub-layers may be, but are not limited to, 2 layers of high refractive-index sub-layers, 3 layers of high refractive-index sub-layers, 4 layers of high refractive-index sub-layers, or 5 layers of high refractive-index sub-layers. Reference can be made to FIG. 4, which is a schematic structural view of a nano coating provided in another implementation of the present disclosure. In FIG. 4, the nano coating 20 includes a high refractive-index layer 21 and a low refractive-index layer 22. The high refractive-index layer 21 includes a high refractive-index sub-layer 21*a* and a high refractive-index sub-layer 21*b*. The high refractive-index sub-layer 21*a* is closer to the second surface 10-2 of the laminated glass 10. In some implementations of the present disclosure, a refractive index of the high refractive-index sub-layer 21*a* may range from 1.9 to 2.2. A refractive index of the high refractive-index sub-layer 21*b* may be greater than or equal to 2.3. In some implementations of the present disclosure, the high refractive-index layer includes two or more high refractive-index sub-layers. A refractive index of any one of the high refractive-index sub-layers is greater than a refractive index of each of other high refractive-index sub-layers closer to the second surface 10-2 of the laminated glass 10. For example, the high refractive-index layer includes three high refractive-index sub-layers. In a direction away from the second surface 10-2 of the laminated glass 10, the three high refractive-index sub-layers are respectively a high refractive-index sub-layer a, a high refractive-index sub-layer b, and a high refractive-index sub-layer c. The high refractive-index sub-layer a is closer to the inner glass plate, and the high refractive-index sub-layer c is closer to the low refractive-index layer. Therefore, a refractive index of the high refractive-index sub-layer b is greater than a refractive index of the high refractive-index sub-layer a, and a refractive index of the high refractive-index sub-layer c is greater than the refractive index of the high refractive-index sub-layer b.

In some implementations of the present disclosure, the high refractive-index material includes an oxide of at least one element of zinc (Zn), tin (Sn), titanium (Ti), niobium (Nb), zirconium (Zr), nickel (Ni), indium (In), aluminum (Al), cerium (Ce), tungsten (W), molybdenum (Mo), antimony (Sb), or bismuth (Bi). In some implementations of the present disclosure, high refractive-index materials include a nitride or a nitrogen oxide of at least one element of silicon (Si), Al, Zr, yttrium (Y), Ce, or lanthanum (La). In some implementations of the present disclosure, the refractive index of the high refractive-index material is greater than or equal to 2.35. The high refractive-index material may be selected from one or more of $TiO_x$, $TiO_xN_y$, or doped $TiO_x$. In some implementations of the present disclosure, the refractive index of the high refractive-index materials is greater than or equal to 1.9 and less than or equal to 2.35. The high refractive-index material may be selected from one or more of $ZnSnO_x$, $Si_3N_4$, ZnO, or aluminum-doped zinc oxide (AZO).

In implementations of the present disclosure, the low refractive-index layer includes a low refractive-index material. A refractive index of the low refractive-index material is less than or equal to 1.8. The refractive index of the low refractive-index material may be, but is not limited to, 1.8, 1.7, 1.6, 1.55, 1.4, 1.3, or less. By reasonably designing the material and thickness of the low refractive-index layer, the nano coating can have excellent mechanical stability, chemical stability, and thermal stability, thereby ensuring that the nano coating has a long service life. Besides, the reflectivity of the nano coating for the P-polarized light can be further improved, and other optical indexes can be optimized. In some implementations of the present disclosure, the refractive index of the low refractive-index material may range from 1.3 to 1.8. In some implementations of the present disclosure, the low refractive-index layer includes multiple low refractive-index sub-layers. The multiple low refractive-index sub-layers may be, but are not limited to, 2 layers of low refractive-index sub-layers, 3 layers of low refractive-index sub-layers, 4 layers of low refractive-index sub-layers, or 5 layers of low refractive-index sub-layers. In some implementations of the present disclosure, the refractive index of the low refractive-index material is less than or equal to 1.55. The low refractive-index material may be selected from one or more of $SiO_2$, $Al_2O_3$, or $MgF_2$. In some implementations of the present disclosure, the low refractive-index material includes a material with anti-reflection function. The material with anti-reflection function may be porous $SiO_2$ or porous $Al_2O_3$. In some implementations of the present disclosure, the low refractive-index layer is a coating with graded refractive-index, such as moth-eye coating, or a gradation coating.

Figure 5:
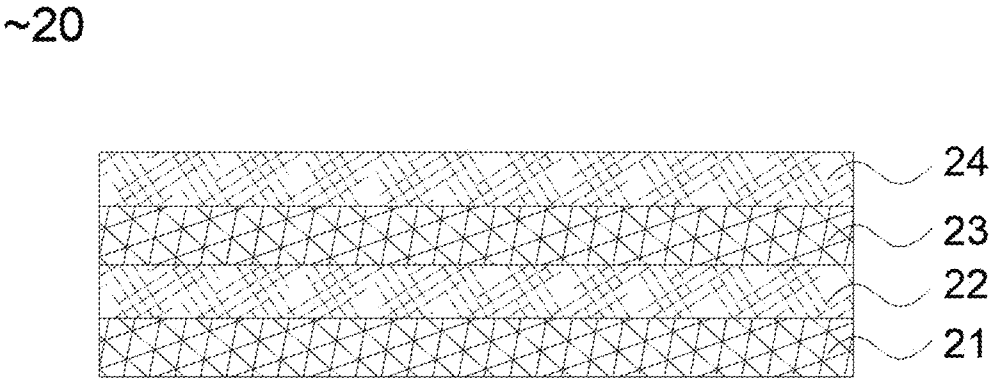
FIG. 5 is a schematic structural view of a nano coating provided in yet another implementation of the present disclosure.

In some implementations of the present disclosure, the number of high refractive-index layers and the number of low refractive-index layers each is multiple. In other words, the nano coating includes at least two high refractive-index layers and at least two low refractive-index layers. Reference can be made to FIG. 5, which is a schematic structural view of a nano coating provided in yet another implementation of the present disclosure. The nano coating includes two high refractive-index layers and two low refractive-index layers. The high refractive-index layers and the low refractive-index layers are alternately stacked, that is, a high refractive-index layer 21, a low refractive-index layer 22, a high refractive-index layer 23, and a low refractive-index layer 24 are alternately stacked.

During driving, in order to ensure safe driving, the head-up display glass is supposed to have a sharp image effect to facilitate a driver to obtain driving information, and a situation outside the vehicle is also supposed to be clearly seen through the head-up display glass. In the present disclosure, the nano-coating has a relatively high reflectivity $R_p$ for the P-polarized light, so that a sharp image can be displayed in the display region. However, when the nano-coating has the relatively high reflectivity $R_p$ for the P-polarized light, the nano-coating also has a relatively high reflectivity for the visible light. Therefore, when the head-up display glass is used as the front windshield of the vehicle, a mirror effect may occur to an inner surface of the front windshield, so that an object in the vehicle may be reflected on the inner surface of the front windshield, resulting in affecting the visual comfort of the driving and even the driving safety of the driver. In order to solve the above problems, the inventor of the present disclosure improves the head-up display glass, thus ensuring that the head-up display glass can realize the sharp image and have better visual effect. In the head-up display glass of the present disclosure, the second surface of the laminated glass includes a display region (e.g., a HUD region) and a non-display region (e.g., a low reflectivity (LR) region). The display region refers to a region where a projection unit projects P-polarized light, that is, a region where the driving information is displayed. The non-display region is a region in the head-up display glass where no driving information needs to be displayed. In implementations of the present disclosure, a reflectivity of the non-display region for the visible light is less than a reflectivity of the display region for the visible light.

In implementations of the present disclosure, the nano coating is disposed on the display region of the second surface of the laminated glass. Due to the nano coating, the reflectivity of the display region for the P-polarized light can be improved, and a sharp head-up display image can be presented in front of the laminated glass. In implementations of the present disclosure, the reflectivity of the display region for the P-polarized light is greater than or equal to 10%, where an angle of incidence of the P-polarized light ranges from 55° to 75°, and the angle of incidence of the P-polarized light may be, but not limited to 55°, 60°, 65°, 70°, or 75°. In the present disclosure, the reflectivity of the display region for the P-polarized light may be, but is not limited to, 10%, 13%, 15%, 20%, or 25%. In implementations of the present disclosure, for the P-polarized light incident at the angle ranging from 55° to 75°, the reflectivity of the non-display region is less than the reflectivity of the display region.

In some implementations of the present disclosure, the transmittance of the display region of the head-up display glass for the visible light is greater than 70%, so that the driving safety can be ensured as much as possible. In some implementations of the present disclosure, considering that the display region only occupies a partial region of the head-up display glass, so that even if the display region has the relatively high reflectivity for the visible light and the relatively low transmittance for the visible light, the display region has a relatively small visual impact on the whole head-up display glass. The transmittance of the display region of the head-up display glass for the visible light may range from 50% to 70%. Therefore, the image sharpness of the display region can be improved, and the driving safety can be taken into consideration. In implementations of the present disclosure, the transmittance of the non-display region of the head-up display glass for the visible light is greater than or equal to 70%.

In implementations of the present disclosure, the reflectivity of the display region for the visible light is greater than or equal to 10%. In some implementations of the present disclosure, the reflectivity $R_H$ of the display region for the visible light ranges from 10% to 30%. The reflectivity of the display region for the visible light may be, but is not limited to, 10%, 15%, 20%, 25%, or 30%. In implementations of the present disclosure, the reflectivity of the non-display region for the visible light ranges from 1% to 15%. In some implementations of the present disclosure, the reflectivity of the non-display region for the visible light ranges from 1% to 5%. The reflectivity of the non-display region for the visible light may be, but is not limited to 1%, 2%, 3%, 4%, or 5%. In some implementations of the present disclosure, the reflectivity of the non-display region for the visible light ranges from 6% to 8%. The reflectivity of the non-display region for the visible light may be, but is not limited to, 6%, 7%, or 8%. In some implementations of the present disclosure, the reflectivity of the non-display region for the visible light ranges from 9% to 15%. The reflectivity of the non-display region for the visible light may be, but is not limited to, 9%, 10%, 11%, 12%, 13%, 14%, or 15%.

In the present disclosure, for the visible light, a difference between the reflectivity of the display region and the reflectivity of the non-display region is greater than or equal to 2%. For the visible light, the difference between the reflectivity of the display region and the reflectivity of the non-display region may be, but is not limited to, 2%, 5%, 7%, 10%, or 15%. When the difference between the reflectivity of the display region for the visible light and the reflectivity of the non-display region for the visible light is greater, the head-up display glass is more comfortable, and an image of head-up display is sharper.

Figure 6:
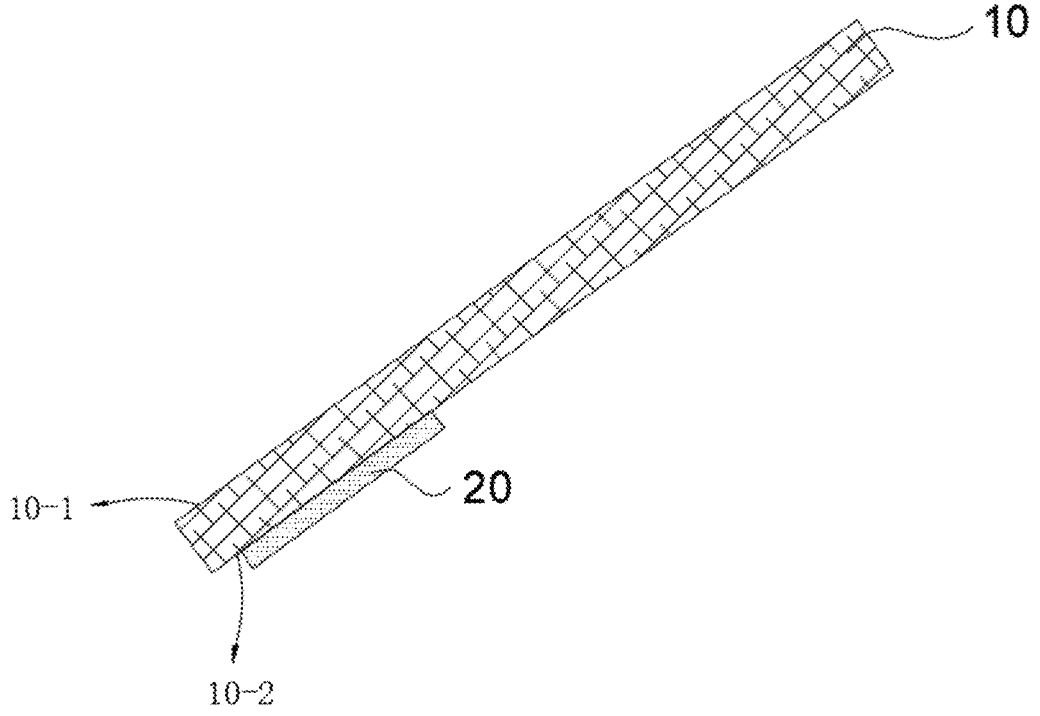
FIG. 6 is a schematic structural view of head-up display glass provided in yet another implementation of the present disclosure.

In some implementations of the present disclosure, no nano coating is disposed on the non-display region of the second surface of the laminated glass. The non-display region is bare laminated glass. In other words, the nano coating is only disposed on the display region of the second surface of the laminated glass, and the nano coating only covers a local region of the second surface. With this structure, the visual interference caused by the mirror image effect can be avoided. Reference can be made to FIG. 6, which is a schematic structural view of head-up display glass provided in yet another implementation of the present disclosure. In FIG. 6, the laminated glass 10 is provided with a nano coating 20 on the second surface 10-2 of the laminated glass 10. An area of the nano coating 20 is smaller than an area of the second surface 10-2. When the non-display region is bare laminated glass, a reflectivity $R_L$ of the non-display region for the visible light is a reflectivity of the second surface of the laminated glass for the visible light. In implementations of the present disclosure, the reflectivity of the second surface of the laminated glass for the visible light ranges from 6% to 8%. The reflectivity of the second surface of the laminated glass for the visible light may be, but is not limited to, 6%, 6.5%, 7%, or 8%.

In some implementations of the present disclosure, the nano coating is also disposed on the non-display region. In order to ensure that the reflectivity of the non-display region for the visible light is less than the reflectivity of the display region for the visible light, the nano coating in the non-display region is different from the nano coating in the display region. Since the nano coating have a certain reflection color, the nano coating in the non-display region may destroy the consistency of the whole appearance and color of the glass, and also affect the visual effect of the head-up display glass. In order to eliminate a color difference between the display region and the non-display region, in some implementations of the present disclosure, an absolute value of a difference between a value of a of a color of the display region and a value of a of a color of the non-display region is less than or equal to 2. For example, when the value of a of the color of the display region is −3, the value of a of the color of the non-display region is from (−5) to (−1). In some implementations of the present disclosure, an absolute value of a difference between a value of b of the color of the display region and a value of b of the color of the non-display region is less than or equal to 2. For example, when the value of b of the color of the display region is −8, the value of b of the color of the non-display region is from (−10) to (−6). When the absolute value of the difference between the value of a of the color of the display region and the value of a of the color of the non-display region is smaller, and the absolute value of the difference between the value of b of the color of the display region and the value of b of the color of the non-display region is smaller, the color difference between the display region and the non-display region is smaller, and the appearance consistency of the head-up display glass is better. Values of Lab are based on the Lab color model. A value of L, a value of a, and a value of b respectively correspond to L, a, and b in the values of Lab (or color values of Lab). L is a luma channel, and a and b are two chroma channels. In some implementations of the present disclosure, the value of a of the color of the display region and the value of a of the color of the non-display region each are less than or equal to 2. Preferably, the value of a of the color of the display region and the value of a of the color of the non-display region each are from (−8) to 0. The value of b of the color of the display region and the value of b of the color of the non-display region each are less than or equal to 2. Preferably, the value of b of the color of the display region and the value of b of the color of the non-display region each are from (−12) to 0. The nano coating with the value of a and the value of b that respectively are in the above ranges presents a neutral color, so that the head-up display glass can have a better visual effect.

Figure 7:
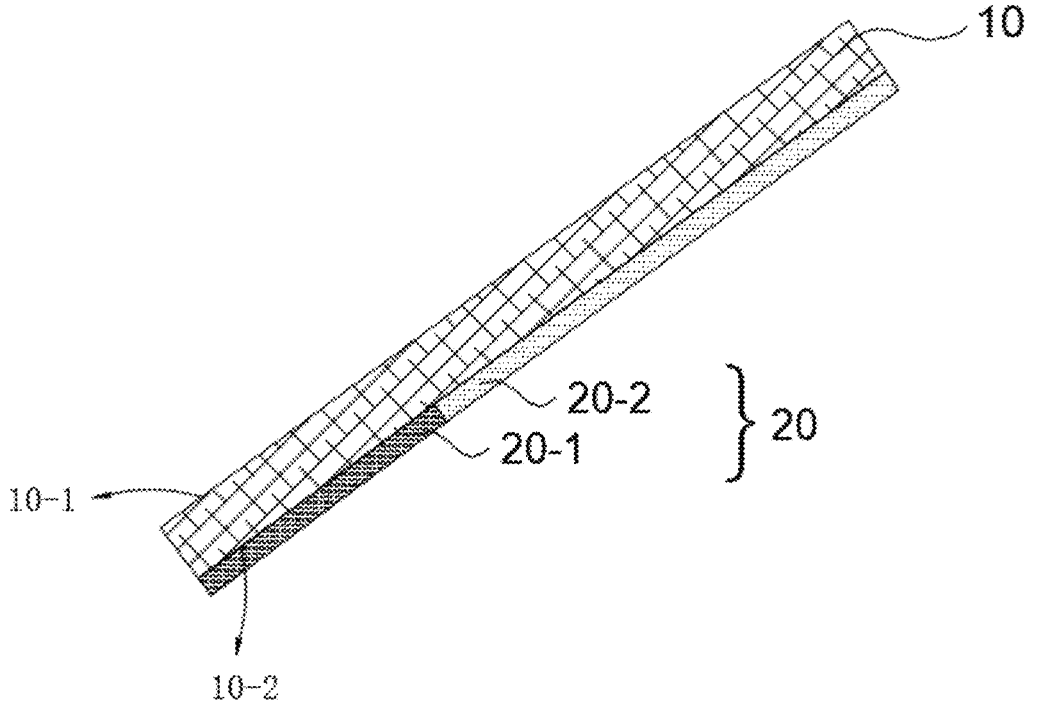
FIG. 7 is a schematic structural view of head-up display glass provided in yet another implementation of the present disclosure.

In the present disclosure, when the nano coating is disposed on the non-display region, the nano coating in the display region is a first nano-coating, and the nano coating in the non-display region is a second nano-coating. The second nano-coating and the first nano-coating are difference in at least one of a material of each layer, an arrangement of each layer, or a thickness of each layer. In order to facilitate production, it is preferable that the second nano-coating and the first nano-coating are the same in a material of each layer and an arrangement of each layer, and are different in a thickness of at least one layer. In implementations of the present disclosure, a reflectivity of the first nano-coating for the visible light is greater than a reflectivity of the second nano-coating for the visible light. A reflectivity of the first nano-coating for the P-polarized light is greater than a reflectivity of the second nano-coating for the P-polarized light. Reference can be made to FIG. 7, which is a schematic structural view of head-up display glass provided in yet another implementation of the present disclosure. In FIG. 7, the nano coating 20 includes a first nano-coating 20-1 and a second nano-coating 20-2. The first nano-coating 20-1 is disposed in a display region of the second surface 10-2 of the laminated glass. The second nano-coating 20-2 is disposed in a non-display region of the second surface 10-2 of the laminated glass. When the reflectivity of the second nano-coating for the visible light is less, it is more helpful to improve the safety and comfort of vehicle driving. In some implementations of the present disclosure, the difference between the reflectivity of the first nano-coating for the visible light and the reflectivity of the second nano-coating for the visible light is greater than or equal to 2%. It can be understood that since the first nano-coating is disposed in the display region and the second nano-coating is disposed in the non-display region, the difference between the reflectivity $R_H$ of the display region for the visible light and the reflectivity $R_L$ of the non-display region for the visible light is greater than or equal to 2%. When the difference between $R_H$ and $R_L$ is greater, the visual effect of the head-up display glass is better. The driving information can be clearly displayed in the display region, and the situation outside the vehicle can be clearly seen through the non-display region. The difference between the reflectivity $R_H$ of the display region for the visible light and the reflectivity $R_L$ of the non-display region for the visible light may be, but is not limited to, 2%, 3%, 4%, 5%, 6%, or greater. In some implementations of the present disclosure, the reflectivity of the display region for the visible light is 16%, and the reflectivity of the non-display region for the visible light is 14%, so a difference between the reflectivity $R_H$ of the display region for the visible light and the reflectivity $R_L$ of the non-display region for the visible light is 2%.

Figure 8:
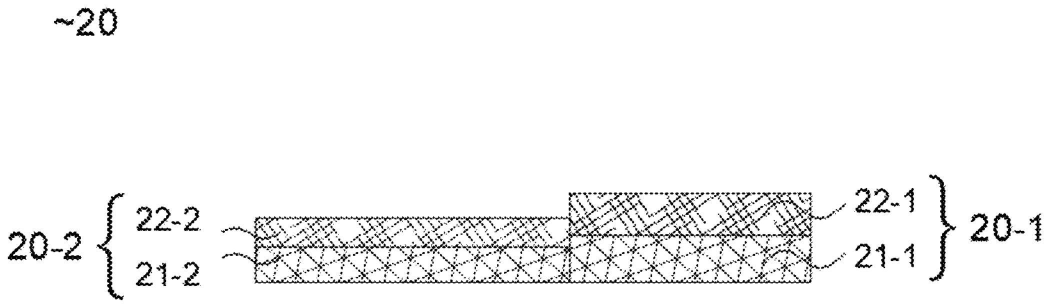
FIG. 8 is a schematic structural view of a nano coating provided in an implementation of the present disclosure.

In some implementations of the present disclosure, a thickness of the second nano-coating is smaller than a thickness of the first nano-coating. When the second nano-coating has a relatively thin thickness, the reflectivity of the second nano-coating for the visible light may decrease. In some implementations of the present disclosure, the first nano-coating includes a first high-refractive-index layer and a first low-refractive-index layer alternately stacked from a second surface of the laminated glass outwards. The second nano-coating includes a second high-refractive-index layer and a second low-refractive-index layer alternately stacked from the second surface of the laminated glass outwards. A thickness of the second high-refractive-index layer is smaller than a thickness of the first high-refractive-index layer. In some implementations of the present disclosure, a thickness of the second low-refractive-index layer is smaller than a thickness of the first low-refractive-index layer. Reference can be made to FIG. 8, which is a schematic structural view of a nano coating provided in an implementation of the present disclosure. The nano coating includes a first nano-coating 20-1 and a second nano-coating 20-2. The first nano-coating 20-1 includes a first high-refractive-index layer 21-1 and a first low-refractive-index layer 22-1. The second nano-coating 20-2 includes a second high-refractive-index layer 21-2 and a second low-refractive-index layer 22-2. A thickness of the second high-refractive-index layer 21-2 is smaller than a thickness of the first high-refractive-index layer 21-1. A thickness of the second low-refractive-index layer 22-2 is smaller than a thickness of the first low-refractive-index layer 22-1. With the above structural arrangement, the reflectivity of the second nano-coating for the visible light can be effectively reduced, so that the reflectivity of the second nano-coating for the visible light is less than the reflectivity of the first nano-coating for the visible light, and the color difference between the first nano-coating and the second nano-coating is relatively small.

Figure 9:
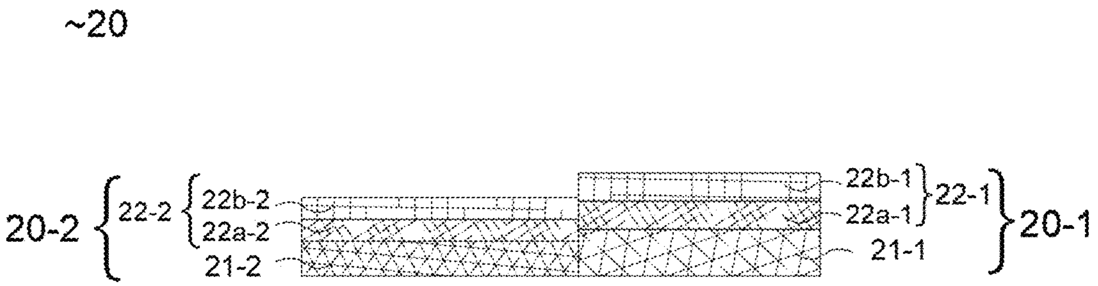
FIG. 9 is a schematic structural view of a nano coating provided in another implementation of the present disclosure.

In the present disclosure, when the first high-refractive-index layer includes multiple first high-refractive-index sub-layers, the thickness of the first high-refractive-index layer refers to the sum of thicknesses of the multiple first high-refractive-index sub-layers. Similarly, when the first low-refractive-index layer includes multiple first low-refractive-index sub-layers, the thickness of the first low-refractive-index layer refers to the sum of thicknesses of the multiple first low-refractive-index sub-layers. In some implementations of the present disclosure, the first low-refractive-index layer includes at least two first low-refractive-index sub-layers. The second low-refractive-index layer includes at least two second low-refractive-index sub-layers. A thickness of a first low-refractive-index sub-layer of the first low-refractive-index layer farthest from the laminated glass is larger than a thickness of a second low-refractive-index sub-layer of the second low-refractive-index layer farthest from the laminated glass. Reference can be made to FIG. 9, which is a schematic structural view of a nano coating provided in another implementation of the present disclosure. The nano coating includes a first nano-coating 20-1 and a second nano-coating 20-2. The first nano-coating 20-1 includes a first high-refractive-index layer 21-1 and a first low-refractive-index layer 22-1. The first low-refractive-index layer 22-1 includes a first low-refractive-index sub-layer **22*a*-1 and a first low-refractive-index sub-layer 22*b*-1. The first low-refractive-index sub-layer 22*b*-1 is further away from the laminated glass than the first low-refractive-index sub-layer 22*a*-1. The second nano-coating 20-2 includes a second high-refractive-index layer 21-2 and a second low-refractive-index layer 22-2. The second low-refractive-index layer 22-2 includes a second low-refractive-index sub-layer 22*a*-2 and a second low-refractive-index sub-layer 22*b*-2. The second low-refractive-index sub-layer 22*b*-2 is further away from the laminated glass than the second low-refractive-index sub-layer 22*a*-2. A thickness of the second low-refractive-index sub-layer 22*b*-2 is smaller than a thickness of the first low-refractive-index sub-layer 22*b*-1**.

Figure 10:
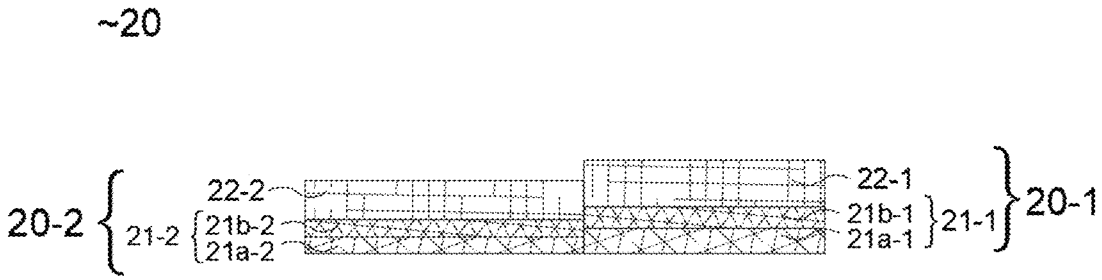
FIG. 10 is a schematic structural view of a nano coating provided in yet another implementation of the present disclosure.

In some implementations of the present disclosure, the first high refractive-index layer includes at least two first high refractive-index sub-layers. The second high refractive-index layer includes at least two second high refractive-index sub-layers. A thickness of a first high refractive-index sub-layer of the first high refractive-index layer closest to the laminated glass is larger than a thickness of a second high refractive-index sub-layer of the second high refractive-index layer closest to the laminated glass. Reference can be made to FIG. 10, which is a schematic structural view of a nano coating provided in yet another implementation of the present disclosure. The nano coating includes a first nano-coating 20-1 and a second nano-coating 20-2. The first nano-coating 20-1 includes a first high-refractive-index layer 21-1 and a first low-refractive-index layer 22-1. The first high-refractive-index layer 21-1 includes a first high-refractive index sub-layer **21*a*-1 and a first high-refractive index sub-layer 21*b*-1. The first high-refractive index sub-layer 21*a*-1 is closer to the laminated glass than the first high-refractive index sub-layer 21*b*-1. The second nano-coating 20-2 includes a second high-refractive-index layer 21-2 and a second low-refractive-index layer 22-2. The second high-refractive-index layer 21-2 includes a second high-refractive-index sub-layer 21*a*-2 and a second high-refractive-index sub-layer 21*b*-2. The second high-refractive-index sub-layer 21*a*-2 is closer to the laminated glass than second high-refractive-index sub-layer 21*b*-2. A thickness of the second high-refractive-index sub-layer 21*a*-2 is smaller than a thickness of the first high-refractive-index sub-layer 21*a*-1**.

In the present disclosure, by adjusting the thickness of the high refractive-index layer and the thickness of the low refractive-index layer in the first nano-coating, and the thickness of the high refractive-index layer and the thickness of the low refractive-index layer in the second nano-coating, the reflectivity of the second nano-coating for the visible light is less than the reflectivity of the first nano-coating for the visible light, so that an effect of both projection and low-reflection for the head-up display glass is realized, thereby improving the driving safety and the driving comfort.

In some implementations of the present disclosure, the second surface of the laminated glass further includes a transition region located between the display region and the non-display region. A reflectivity of the transition region for the visible light is greater than the reflectivity of the non-display region for the visible light and less than the reflectivity of the display region for the visible light. By arranging the transition region between the display region and the non-display region, there is a certain gradual change between the color of the display region and the color of the non-display region, so that the head-up display glass has a harmonious appearance. In implementations of the present disclosure, the reflectivity of the transition region for the visible light may change regularly. For example, the reflectivity of the transition region for the visible light may tend to decrease in a direction from the display region to the non-display region. The reflectivity of the transition region for the visible light may also change irregularly.

In some implementations of the present disclosure, the head-up display glass may also include one or more of an anti-fingerprint coating, a thermal insulation coating, an electric heating coating, an anti-ultraviolet (UV) coating, or an anti-fog coating. In some implementations of the present disclosure, the anti-fingerprint coating is disposed on the second surface 10-2 of the laminated glass and at least covers the display region. Preferably, the anti-fingerprint coating covers the display region and the non-display region to prevent contamination of the display region by fingerprints or the like, thereby ensuring that the display region can realize higher quality head-up display. In implementations of the present disclosure, the thermal insulation coating may be disposed on the second surface of the outer glass plate of the laminated glass, on the second surface of the inner glass plate of the laminated glass, or between the second surface of the outer glass plate and the second surface of the inner glass plate. The thermal insulation coating may be one or more of a single silver thermal insulation coating, a double silver thermal insulation coating, a three silver thermal insulation coating, a four silver thermal insulation coating, a thermal insulation/heat absorption PVB, a thermal insulation coating based on a metal material (e.g., NiCr, TiN, etc.) or a nonmetal material. The single silver thermal insulation coating, the double silver thermal insulation coating, the three silver thermal insulation coating, or the four silver thermal insulation coating respectively refers to a transparent nano thermal insulation coating having one silver layer, two silver layers, three silver layers, or four silver layers. Besides the silver layer, the transparent nano thermal insulation coating further includes at least two dielectric layers. With the thermal insulation coating, the vehicle can be more comfortable to ride. The single silver thermal insulation coating, the double silver thermal insulation coating, the three silver thermal insulation coating, or the four silver thermal insulation coating may be directly disposed on the second surface of the outer glass plate of the laminated glass or the second surface of the inner glass plate of the laminated glass by a magnetron sputtering deposition process. Alternatively, the single silver thermal insulation coating, the double silver thermal insulation coating, the three silver thermal insulation coating, or the four silver thermal insulation coating may be disposed on the surface of the intermediate layer. The intermediate layer may be polyethylene terephthalate (PET). Then, the intermediate layer provided with the single silver thermal insulation coating, the double silver thermal insulation coating, the three silver thermal insulation coating, or the four silver thermal insulation coating is disposed between the second surface of the outer glass plate of the laminated glass and the second surface of the inner glass plate of the laminated glass.

In some implementations of the present disclosure, the electric heating coating is disposed on the second surface of the outer glass plate of the laminated glass, on the second surface of the inner glass plate of the laminated glass, or both the second surface of the outer glass plate and the second surface of the inner glass plate. The electric heating coating may be any one of a single silver electric heating coating, a double silver electric heating coating, a three silver electric heating coating, a four silver electric heating coating, and a five silver electric heating coating. By disposing at least two bus bars between the second surface of the outer glass plate and the second surface of the inner glass plate, the current of the power supply can be input into the electric heating coating, so that the electric heating coating can heat the laminated glass to realize functions of defrosting, defogging, and even deicing and snow removal, further improving driving safety and preventing the display region from being unable to realize the head-up display caused by environment interference. The single silver electric heating coating, the double silver electric heating coating, the three silver electric heating coating, the four silver electric heating coating, or the five silver electric heating coating respectively refers to a transparent nano conducting coating having one silver layer, two silver layers, three silver layers, four silver layers, or five silver layers. Besides the silver layer, the transparent nano conducting coating further includes at least two dielectric layers.

In some implementations of the present disclosure, the thermal insulation/thermal absorption PVB and the anti-UV coating may be disposed between the second surface of the outer glass plate and the second surface of the inner glass plate. The thermal insulation/thermal absorption PVB and the anti-UV coating may be obtained by adding an infrared reflecting component, an infrared absorbing component, and/or an UV absorbing component to the standard PVB.

In some implementations of the present disclosure, the anti-fog coating is disposed on the second surface 10-2 of the laminated glass and at least covers the display region. Preferably, the anti-fog coating covers the display region and the non-display region. The anti-fog coating can prevent water mist and the like from interfering the display region, so as to realize the head-up display function. The anti-fog coating can further reduce an influence of water mist on signals of a sensor mounted on the laminated glass, so as to ensure the recognition accuracy of the sensor such as a camera, a lidar, etc.

Figure 11:
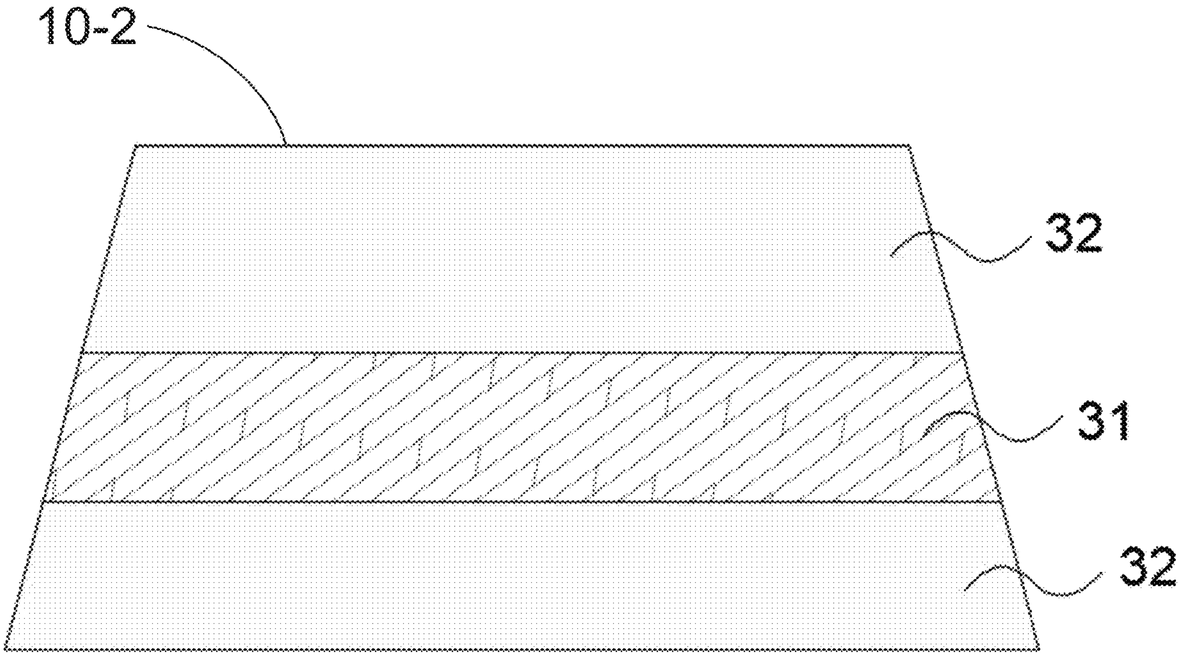
FIG. 11 is a schematic view of region partition of a second surface of laminated glass provided in an implementation of the present disclosure.
Figure 12:
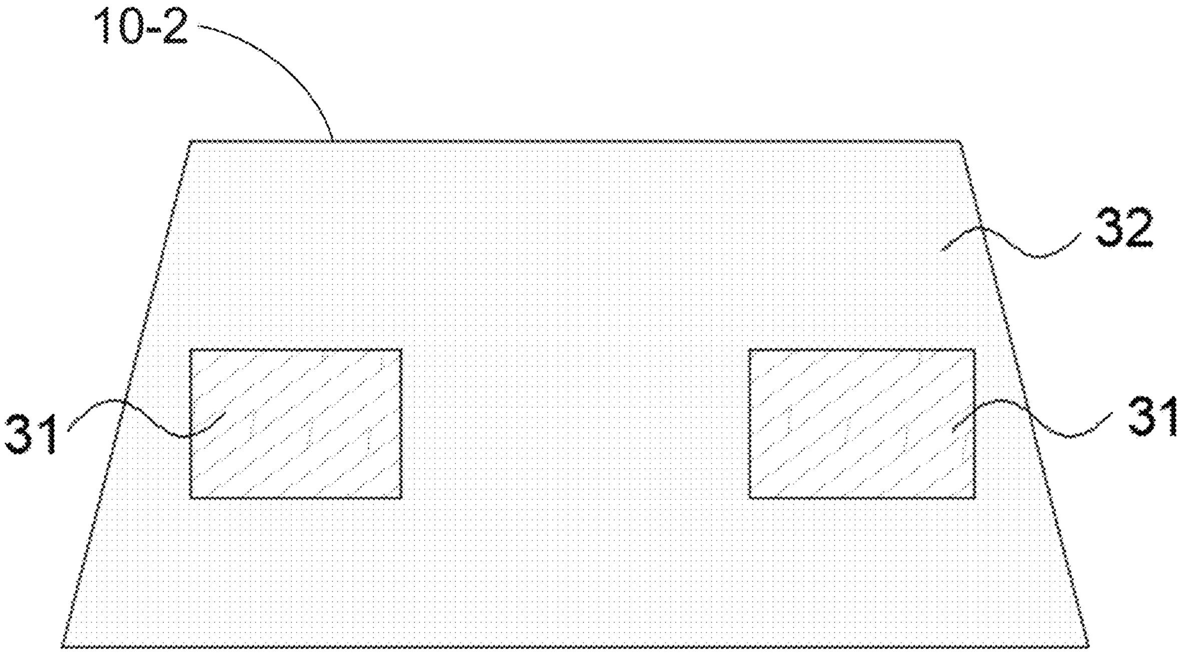
FIG. 12 is a schematic view of region partition of a second surface of laminated glass provided in another implementation of the present disclosure.
Figure 13:
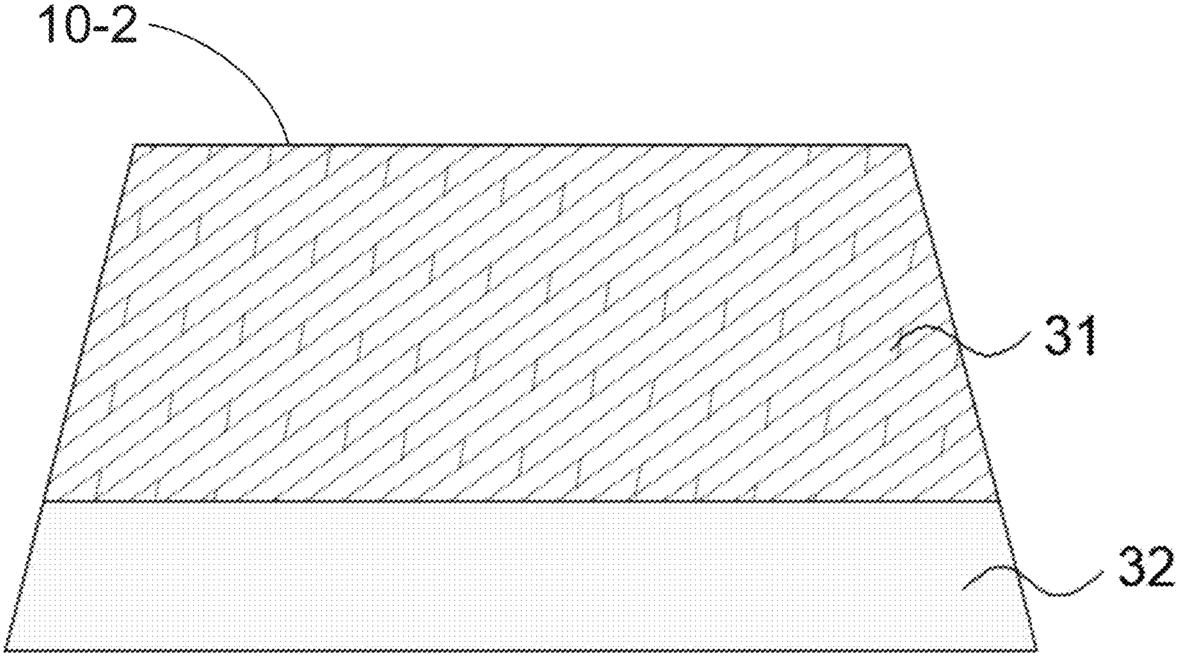
FIG. 13 is a schematic view of region partition of a second surface of laminated glass provided in yet another implementation of the present disclosure.
Figure 14:
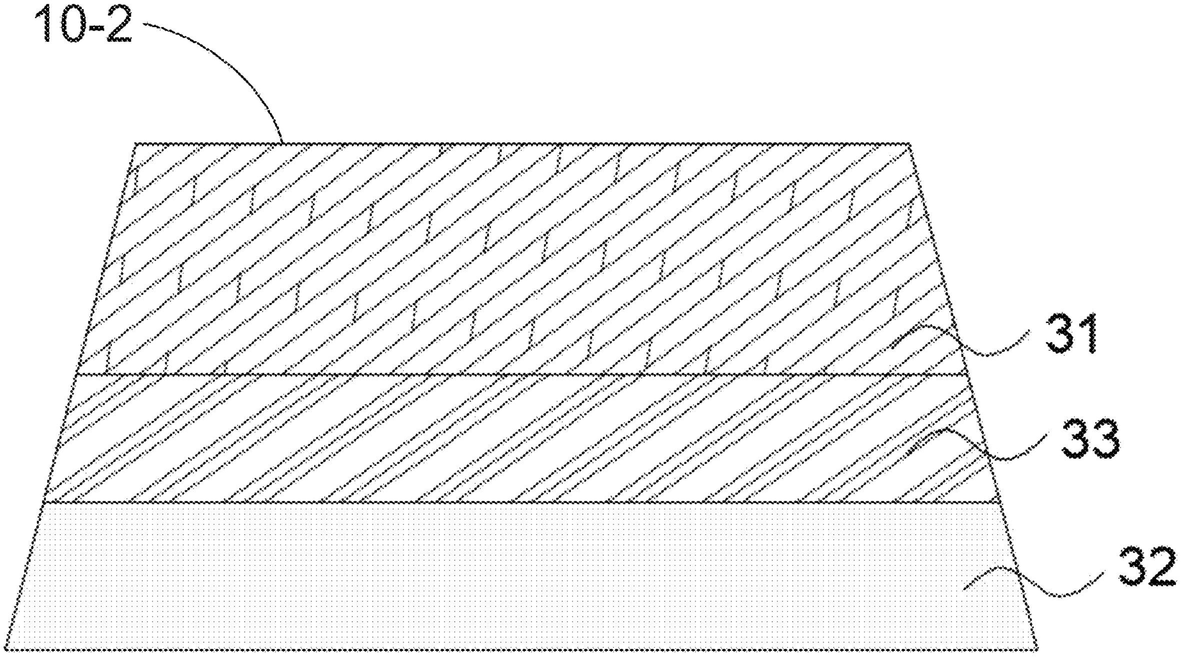
FIG. 14 is a schematic view of region partition of a second surface of laminated glass provided in yet another implementation of the present disclosure.
Figure 15:
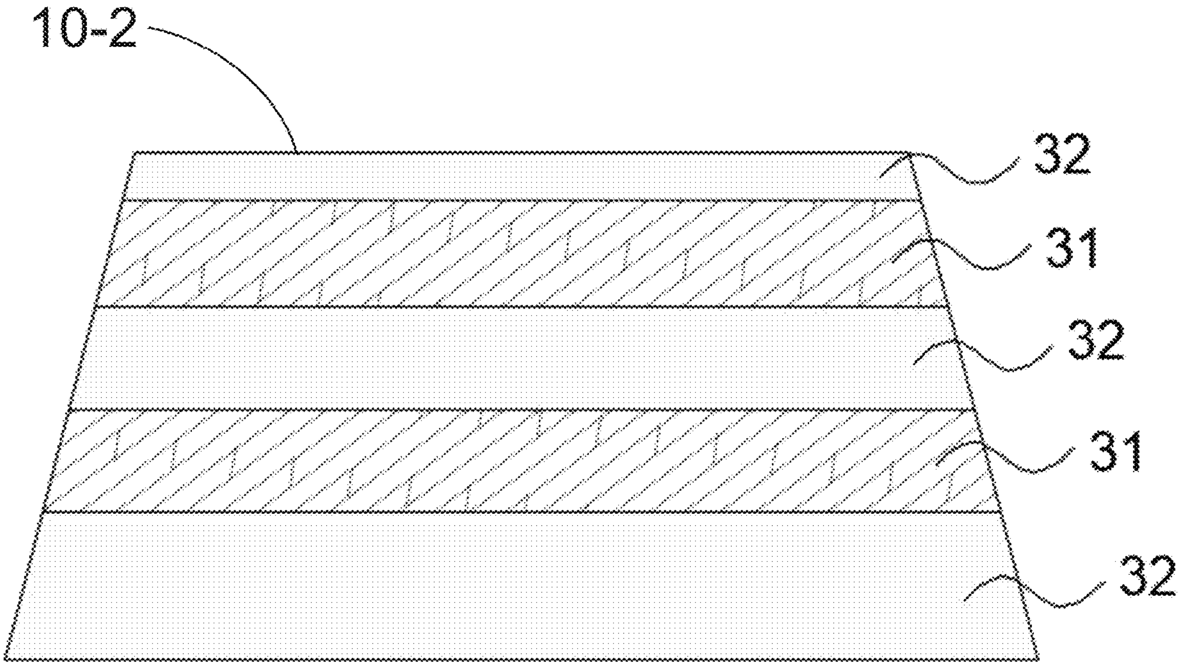
FIG. 15 is a schematic view of region partition of a second surface of laminated glass provided in yet another implementation of the present disclosure.

In the present disclosure, a position and a size of each of the display region and the non-display region can be adjusted according to requirements. Reference can be made to FIG. 11, which is a schematic view of region partition of a second surface of laminated glass provided in an implementation of the present disclosure. In FIG. 11, the second surface of the laminated glass includes a display region 31 and a non-display region 32, and the display region 31 is located in the middle of the head-up display glass. Reference can be made to FIG. 12, which is a schematic view of region partition of a second surface of laminated glass provided in another implementation of the present disclosure. In FIG. 12, the second surface of the laminated glass includes two display regions 31, and a region other than the display regions 31 is a non-display region 32. The nano coating has a more obvious mirror effect on a nearby object, that is, the reflection of the object close to the inner surface of the head-up display glass is sharper, so the bottom of the head-up display glass can serve as the non-display region. Reference can be made to FIG. 13, which is a schematic view of region partition of a second surface of laminated glass provided in yet another implementation of the present disclosure. In FIG. 13, a non-display region 32 is disposed at the bottom of the second surface. Reference can be made to FIG. 14, which is a schematic view of region partition of a second surface of laminated glass provided in yet another implementation of the present disclosure. In FIG. 14, the second surface includes a display region 31, a non-display region 32, and a transition region 33 located between the display region 31 and the non-display region 32. Reference can be made to FIG. 15, which is a schematic view of region partition of a second surface of laminated glass provided in yet another implementation of the present disclosure. In FIG. 15, the second surface includes two display regions 31 and three non-display regions 32, and the display regions are located in the middle region of the second surface.

In the present disclosure, an area of the display region is smaller than an area of the second surface of the inner glass plate. The area of the display region can be adjusted according to requirements. In some implementations of the present disclosure, the area of the display region is greater than or equal to 25 $mm^2$. The area of the display region may be, but is not limited to, 50 $mm^2$, 100 $mm^2$, 200 $mm^2$, 500 $mm^2$, 1000 $mm^2$, 5000 $mm^2$, 10000 $mm^2$, etc. If the area of the display region is less than 25 $mm^2$, a projected image may be relatively small, and less driving information can be projected, resulting in inconvenience in use. In some implementations of the present disclosure, in order to realize augmented reality head-up display (AR-HUD), the area of the display region is greater than or equal to 500 $mm^2$. The area of the display region may be, for example, 120000 $mm^2$.

For the head-up display glass provided in the present disclosure, the sharp image can be presented in the display region, while the reflectivity of the non-display region for the visible light is less, thereby weakening the mirror effect, reducing the reflection in the vehicle, and realizing safe driving.

The head-up display glass in the present disclosure can be manufactured in a variety of methods. In some implementations of the present disclosure, the head-up display glass is manufactured by a thin coating patterning method (a coating removal method). The coating removal method refers to local coating removal of the manufactured coating layer, so as to reduce the thickness of a certain coating layer or directly remove a certain coating layer. For example, the first nano-coating may be manufactured on the second surface of the laminated glass first to form the first nano-coating in the display region and the non-display region, then the first nano-coating in the non-display region may be removed to meet the requirements of the non-display region, and then the second nano-coating may be manufactured in the non-display region. In some implementations of the present disclosure, the second nano-coating may be manufactured on the second surface of the laminated glass first to form the second nano-coating in the display region and the non-display region, and then the second nano-coating in the display region may be removed and the first nano-coating may be manufactured in the display region to meet the requirements of the display region.

In implementations of the present disclosure, the coating removal method may include one or more of a dry etching method (e.g., laser, etc.), a wet etching method (e.g., etching paste, acid etching, etc.), or a mask method (e.g., peelable mask, cover plate, etc.). During specific manufacturing, different coating removal processes can be adopted according to coating materials. In some implementations of the present disclosure, the first nano-coating has a structure of $ZnSnO_x$ (38 nm)/$TiO_2$ (52 nm)/$SiO_2$ (115 nm) ($ZnSnO_x$ (38 nm) is closer to the glass than $TiO_2$ (52 nm) and $SiO_2$ (115 nm)). The head-up display glass is manufactured by the mask method, including the following. The non-display region is covered by a cover plate, the first nano-coating is manufactured in the display region, and the head-up display glass is obtained by removing the cover plate. In some implementations of the present disclosure, the second nano-coating is a coating system of $ZnSnO_x$ (18 nm)/$SiO_2$ (28 nm)/$ZnSnO_x$ (102 nm)/$SiO_2$ (90 nm). After the second nano-coating is manufactured in both the display region and the non-display region, a coating layer in the display region is removed by laser to obtain the display region that is not covered by the second nano-coating. Then the non-display region is covered by the cover plate, the first nano-coating is manufactured in the display region, where the first nano-coating has the structure of $ZnSnO_x$ (38 nm)/$TiO_2$ (52 nm)/$SiO_2$ (115 nm), and the head-up display glass is obtained.

In some implementations of the present disclosure, the first nano-coating has a structure of $ZnSnO_x$ (14.4 nm)/$TiO_2$ (58.6 nm)/$SiO_2$ (112.4 nm) ($ZnSnO_x$ (14.4 nm) is close to the glass). The second nano-coating has a structure of $ZnSnO_x$ (14.4 nm)/$SiO_2$ (112.4 nm). The head-up display glass may be manufactured as follows. A $ZnSnO_x$ coating and a $TiO_2$ coating are deposited on the second surface of the laminated glass first, and then the $TiO_2$ coating in the non-display region is removed, so that there is no $TiO_2$ coating in the non-display region. Then a $SiO_2$ coating is deposited in both the display region and the non-display region, so as to obtain the head-up display glass.

In some implementations of the present disclosure, the first nano-coating has a structure of $ZnSnO_x$ (38 nm)/$TiO_2$ (52 nm)/$SiO_2$ (115 nm). The second nano-coating has a structure of $ZnSnO_x$ (47 nm)/$TiO_2$ (52 nm)/$SiO_2$ (115 nm). The head-up display glass may be manufactured as follows. After $ZnSnO_x$ of 47 nm is deposited on the second surface of the laminated glass first, $ZnSnO_x$ of 9 nm in the display region is removed by laser or other dry etching methods, and then $TiO_2$ (52 nm) and $SiO_2$ (115 nm) are manufactured, so as to obtain the first nano-coating in the display region and the second nano-coating in the non-display region.

In some implementations of the present disclosure, the first nano-coating has a structure of $ZnSnO_x$ (38 nm)/$TiO_2$ (52 nm)/$SiO_2$ (115 nm). The second nano-coating has a structure of $ZnSnO_x$ (38 nm)/$TiO_2$ (52 nm)/$SiO_2$ (110 nm). The head-up display glass may be manufactured as follows. The first nano-coating is manufactured on the second surface of the laminated glass first, and then $SiO_2$ with the thickness of 5 nm in the non-display region is removed by etching paste or laser etching to obtain the second nano-coating.

Figure 16:
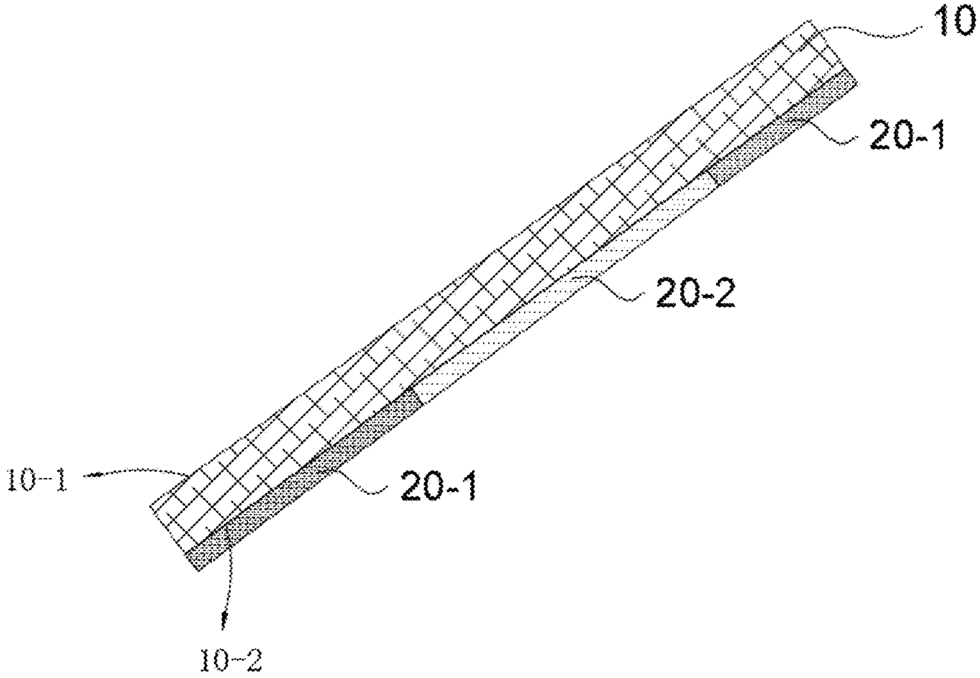
FIG. 16 is a schematic structural view of head-up display glass provided in yet another implementation of the present disclosure.

In some implementations of the present disclosure, the head-up display glass is manufactured by a non-uniform coating method. Since an area of a front windshield of the vehicle is generally larger than 1.2 $m^2$, if a vacuum coating method such as sputtering is used, a relatively large coating chamber is needed. The gas introduced into the coating chamber is distributed according to a certain proportion, so the deposition thickness of the coating layer can be adjusted by changing the proportion of gas distribution, and then different coating layers can be formed on the surface of the laminated glass. In some implementations of the present disclosure, the first nano-coating has a structure of $ZnSnO_x$ (38 nm)/$TiO_2$ (52 nm)/$SiO_2$ (115 nm), and the second nano-coating has a structure of $ZnSnO_x$ (38 nm)/$TiO_2$ (52 nm)/$SiO_2$ (105 nm), where $ZnSnO_x$ (38 nm) is close to the laminated glass. The head-up display glass may be manufactured as follows. $ZnSnO_x$ (38 nm) and $TiO_2$ (52 nm) are manufactured on the second surface of the laminated glass first. During manufacturing of a $SiO_2$ coating, the gas is normally introduced into the display region to form the $SiO_2$ coating with the thickness of 115 nm on the surface of $ZnSnO_x$ (38 nm)/$TiO_2$ (52 nm), and a flow rate of oxygen is increased for the non-display region at the same time. When coating is finished, the thickness of the $SiO_2$ coating in the non-display region is smaller than the thickness of the $SiO_2$ coating on the display region, and the thickness of the $SiO_2$ coating in the non-display region is 105 nm. Reference can be made to FIG. 16, which is a schematic structural view of head-up display glass provided in yet another implementation of the present disclosure. The second nano-coating 20-2 is located at the middle position of the second surface 10-2 of the laminated glass 10. The first nano-coating 20-1 is located at the edge position of the second surface 10-2 of the laminated glass 10. The head-up display glass with this structure can be manufactured by a non-uniform coating method. Since the gas in the coating chamber is distributed in a certain proportion, there is a certain transition for the thickness of the second nano-coating has a certain transition, which is beneficial to improving the appearance consistency of the head-up display glass.

Figure 17:
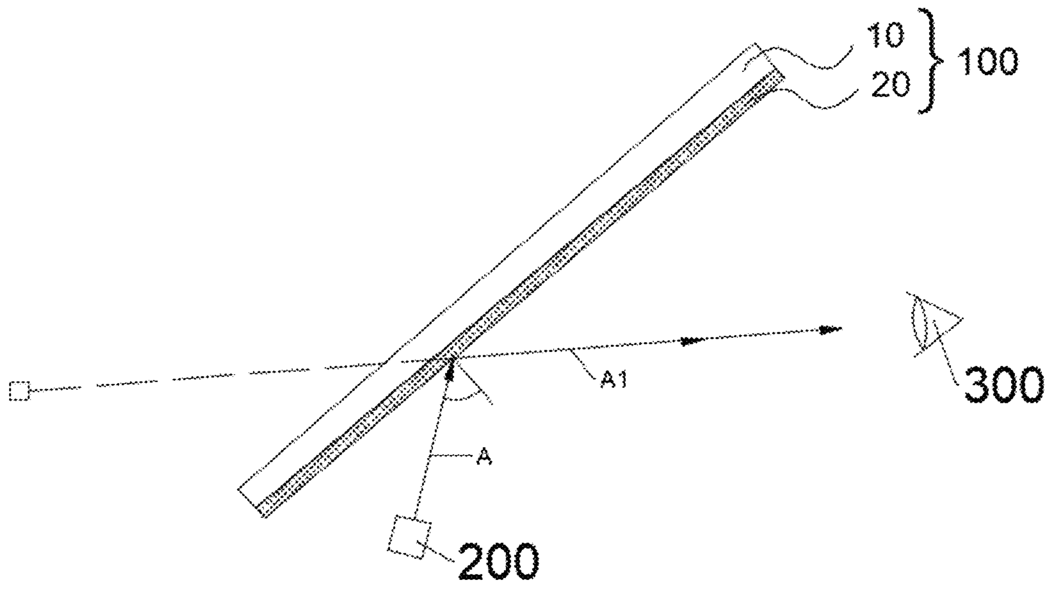
FIG. 17 is a schematic structural view of a head-up display system provided in an implementation of the present disclosure.

A head-up display system is further provided in the present disclosure. The head-up display system includes a projection unit and the head-up display glass in the present disclosure. The projection unit is configured to produce P-polarized light. The P-polarized light is incident onto the display region. Reference can be made to FIG. 17, which is a schematic structural view of a head-up display system provided in an implementation of the present disclosure. The head-up display system includes a projection unit 200 and the head-up display glass 100 provided in the present disclosure. The head-up display glass 100 includes the laminated glass 10 and the nano coating 20. The projection unit 200 is configured to project text and image information related to the driving process, such as speed, engine revolution, fuel consumption, tire pressure, dynamic navigation, night vision, real scene map, etc., onto the head-up display glass, so as to be received by eyes 300 of an observer. Specifically, the projection unit 200 can produce the P-polarized light, the P-polarized light A is incident onto the nano coating 20, the nano coating 20 can directly reflect part of the polarized light to form reflected light A1, and the reflected light A1 can be directly received by the eyes 300 of the observer, so as to enable the observer to obtain projected information. Meanwhile, since the non-display region in the present disclosure has a relatively low reflectivity for the visible light and a relatively weak mirror effect, the situation outside the vehicle can be clearly seen through the non-display region, thereby ensuring the safety and comfort during driving.

In implementations of the present disclosure, an angle of incidence of the P-polarized light incident onto the nano coating 20 ranges from 55° to 75°, and the reflectivity of the nano coating 20 for the P-polarized light is greater than or equal to 10%. Therefore, the head-up display (HUD) is realized and even augmented reality head-up display (AR-HUD) can be realized. In implementations of the present disclosure, the position of the projection unit 200 and the angle of incidence of the P-polarized light can be adjusted according to the position and height of the observer. In the present disclosure, a proportion of the P-polarized light produced by the projection unit 200 is greater than or equal to 80%, more preferably greater than or equal to 90%, or even 100%.

The technical schemes of the present disclosure are further described below in terms of multiple embodiments.

Embodiment 1

A method for manufacturing head-up display glass includes the following. A first glass plate is provided and conveyed to a coating production line. A $ZnSnO_x$ coating with a thickness of 38 nm, a $TiO_2$ coating with a thickness of 52 nm, and a $SiO_2$ coating with a thickness of 115 nm are deposited on a surface of the first glass plate in sequence, to form a first nano-coating. The first nano-coating in the non-display region is etched by laser, so that the $ZnSnO_x$ coating with a thickness of 10 nm in the non-display region is left to obtain a second nano-coating. The first nano-coating in the display region has a structure of $ZnSnO_x$ (38 nm)/$TiO_2$ (52 nm)/$SiO_2$ (115 nm). The second nano-coating in the non-display region has a structure of $ZnSnO_x$ (10 nm). After the nano coating is formed on the first glass plate, the first glass plate is used as an inner glass plate of laminated glass, and solar green (SG) glass with a thickness of 2.1 mm from FUYAO GLASS INDUSTRY GROUP CO., LTD. (Fuyao Group) is used as an outer glass plate of the laminated glass. The outer glass plate and the inner glass plate are bent according to a high-temperature forming process of vehicle glass. A colorless PVB film with a thickness of 0.76 mm is prepared to be preliminarily laminated with the outer glass plate and the inner glass plate that are bent, where the nano coating of the first glass plate is away from the PVB film. After high-pressure lamination is performed on the outer glass plate and the inner glass plate that are bent and the PVB film in an autoclave, the head-up display glass is obtained.

Embodiment 2

A method for manufacturing head-up display glass includes the following. A first glass plate is provided and conveyed to a coating production line. A $ZnSnO_x$ coating with a thickness of 38 nm, a $TiO_2$ coating with a thickness of 52 nm, and a $SiO_2$ coating with a thickness of 115 nm are deposited on a surface of the first glass plate in sequence, to form a first nano-coating. The first nano-coating in the non-display region is etched by using an etching paste from Merck to remove the first nano-coating in the non-display region, that is, the non-display region is a bare glass surface. The first nano-coating in the display region has a structure of $ZnSnO_x$(38 nm)/$TiO_2$ (52 nm)/$SiO_2$ (115 nm). The non-display region is the bare glass surface. The first glass plate is used as an inner glass plate of laminated glass, and SG glass with a thickness of 2.1 mm from Fuyao Group is used as an outer glass plate. The outer glass plate and the inner glass plate are bent according to a high-temperature forming process of vehicle glass. A colorless PVB film with a thickness of 0.76 mm is prepared to be preliminarily laminated with the outer glass plate and the inner glass plate that are bent, where the nano coating of the first glass plate is away from the PVB film. After high-pressure lamination is performed on the outer glass plate and the inner glass plate that are bent and the PVB film in an autoclave, the head-up display glass is obtained.

Embodiment 3

A method for manufacturing head-up display glass includes the following. A first glass plate is provided and conveyed to a coating production line. After a $ZnSnO_x$ coating with a thickness of 14.4 nm is deposited on a surface of the first glass plate, a non-display region is covered by a cover plate, a $TiO_2$ coating with a thickness of 58.6 nm is deposited in the display region. After removing the cover plate, a $SiO_2$ coating with a thickness of 112.4 nm is deposited in the display region and the non-display region, to form a first nano-coating and a second nano-coating. The first nano-coating in the display region has a structure of $ZnSnO_x$ (14.4 nm)/$TiO_2$ (58.6 nm)/$SiO_2$ (112.4 nm). The second nano-coating in the non-display region has a structure of $ZnSnO_x$ (14.4 nm)/$SiO_2$ (112.4 nm). The first glass plate is used as an inner glass plate of laminated glass, and SG glass with a thickness of 2.1 mm from Fuyao Group is used as an outer glass plate. The outer glass plate and the inner glass plate are bent according to a high-temperature forming process of vehicle glass. A colorless PVB film with a thickness of 0.76 mm is prepared to be preliminarily laminated with the outer glass plate and the inner glass plate that are bent, where the nano coating of the first glass plate is away from the PVB film. After high-pressure lamination is performed on the outer glass plate and the inner glass plate that are bent and the PVB film in an autoclave, the head-up display glass is obtained.

Embodiment 4

A method for manufacturing head-up display glass includes the following. A first glass plate is provided and conveyed to a coating production line. A $ZnSnO_x$ coating with a thickness of 25 nm, a $SiO_2$ coating with a thickness of 10 nm, a $TiO_2$ coating with a thickness of 70 nm (at the most), and a $SiO_2$ coating with a thickness of 110 nm are deposited on a surface of the first glass plate in sequence. The $TiO_2$ coating is manufactured by a non-uniform coating method. That is, by controlling a flow rate of oxygen, the proportion of oxygen distribution is adjusted, so as to deposit the $TiO_2$ coating with different thicknesses on a surface of a $ZnSnO_x$/$SiO_2$ coating. The thickness of the $TiO_2$ coating in the display region is 60 nm, the thickness of the $TiO_2$ coating in the non-display region is 70 nm, and the thickness of the $TiO_2$ coating in the transition region is greater than 60 nm and less than 70 nm. A first nano-coating in the display region has a structure of $ZnSnO_x$ (25 nm)/$SiO_2$ (10 nm)/$TiO_2$ (60 nm)/$SiO_2$ (110 nm). The nano coating in the transition region has a structure of $ZnSnO_x$ (25 nm)/$SiO_2$ (10 nm)/$TiO_2$ (60 nm-70 nm)/$SiO_2$ (110 nm). A second nano-coating in the non-display region has a structure of $ZnSnO_x$(25 nm)/$SiO_2$ (10 nm)/$TiO_2$ (70 nm)/$SiO_2$ (110 nm). The first glass plate is used as an inner glass plate of laminated glass, and SG glass with a thickness of 2.1 mm from Fuyao Group is used as an outer glass plate. The outer glass plate and the inner glass plate are bent according to a high-temperature forming process of vehicle glass. A colorless PVB film with a thickness of 0.76 mm is prepared to be preliminarily laminated with the outer glass plate and the inner glass plate that are bent, where the nano coating of the first glass plate is away from the PVB film. After high-pressure lamination is performed on the outer glass plate and the inner glass plate that are bent and the PVB film in an autoclave, the head-up display glass is obtained.

Implementation 5

A method for manufacturing head-up display glass includes the following. A first glass plate is provided and conveyed to a coating production line. A $TiO_2$ coating with a thickness of 10 nm, a $SiO_2$ coating with a thickness of 45 nm, and a $TiO_2$ coating with a thickness of 20 nm are deposited on a surface of the first glass plate in sequence. After a non-display region is covered by a cover plate, a $SiO_2$ coating with a thickness of 150 nm, a $TiO_2$ coating with a thickness of 46.5 nm, and a $SiO_2$ coating with a thickness of 110 nm are deposited on the display region in sequence. Then the cover plate is removed to obtain a first nano-coating and a second nano-coating. The first nano-coating in the display region has a structure of $TiO_2$ (10 nm)/$SiO_2$ (45 nm)/$TiO_2$ (20 nm)/$SiO_2$ (150 nm)/$TiO_2$ (46.5 nm)/$SiO_2$ (110 nm). The second nano-coating in the non-display region has a structure of $TiO_2$ (10 nm)/$SiO_2$ (45 nm)/$TiO_2$ (20 nm). The first glass plate is used as an inner glass plate of laminated glass, and green glass with a thickness of 2.1 mm from Fuyao Group is used as an outer glass plate. The outer glass plate and the inner glass plate are bent according to a high-temperature forming process of vehicle glass. A colorless PVB film with a thickness of 0.76 mm is prepared to be preliminarily laminated with the outer glass plate and the inner glass plate that are bent, where the nano coating of the first glass plate is away from the PVB film. After high-pressure lamination is performed on the outer glass plate and the inner glass plate that are bent and the PVB film in an autoclave, the head-up display glass is obtained.

Embodiment 6

A method for manufacturing head-up display glass includes the following. A first glass plate is provided and conveyed to a coating production line. The non-display region is covered by a peelable mask. A $ZnSnO_x$ with a thickness of 30 nm and a $TiO_2$ coating with a thickness of 30 nm are deposited in the display region in sequence. With adoption of a porous $SiO_2$ sol, a porous $SiO_2$ layer is manufactured in the display region by a dip-coating method (e.g., a surface of one side of the first glass plate with no region partition is covered by a mask method, so as to ensure that the porous $SiO_2$ layer is formed only in the display region), and then the peelable mask is removed. The first nano-coating in the display region has a structure of $ZnSnO_x$ (30 nm)/$TiO_2$ (30 nm)/porous $SiO_2$ (110 nm). The non-display region is bare glass surface. A second glass plate is provided. The second glass plate is colorless glass with a thickness of 2.1 mm. A double silver thermal insulation coating is deposited on the second glass plate. The double silver thermal insulation coating has a structure of $ZnSnO_x$ (23 nm)/AZO (10 nm)/Ag (9.7 nm)/AZO (15 nm)/$ZnSnO_x$ (67 nm)/AZO (10 nm)/Ag (9.0 nm)/AZO (10 nm)/$ZnSnO_x$ (28.5 nm). The first glass plate is used as an inner glass plate of the laminated glass, and the second glass plate is used as an outer glass plate. The outer glass plate and the inner glass plate are bent according to a high-temperature forming process of vehicle glass. A colorless PVB film with a thickness of 0.76 mm is prepared to be preliminarily laminated with the outer glass plate and the inner glass plate that are bent. The nano coating of the first glass plate is away from the PVB film, and the double silver thermal insulation coating of the second glass plate is close to the PVB film. After high-pressure lamination is performed on the outer glass plate and the inner glass plate that are bent and the PVB film in an autoclave, the head-up display glass is obtained. The porous $SiO_2$ layer has a refractive index of 1.383 after high-temperature forming.

Effect Embodiment

In order to verify the performance of head-up display glass manufactured in the present disclosure, an effect embodiment is further provided in the present disclosure.

1) The head-up display glass of each of embodiments 1 to 6 and a projection unit are assembled into a head-up display system. The projection unit is a thin film transistor liquid crystal display (TFT-LCD) projector with light-emitting diode (LED) backlight, which can produce P-polarized light. A position of the projection unit, and an angle and an exiting angle of exiting light are adjusted, so that a display image observed by an observer can be sharpest. For all embodiments 1 to 6, the P-polarized light is incident at an angle of incidence of 60°. The reflectivity of the head-up display glass for the P-polarized light is measured, and the reflectivity of the head-up display glass for the visible light is measured. The chromaticity [Lab International Commission on Illumination (CIE)] of the display region and the chromaticity [Lab (CIE)] of the non-display region of the head-up display glass in each of embodiments 1 to 6 is tested by a chromaticity tester, where a represents red-green chromaticness index and b represents yellow-blue chromaticness index. The property parameters of the head-up display glass in each of embodiments 1 to 6 are illustrated in Table 1.

Therefore, the sharp image in the display region is ensured, the mirror effect in the non-display region is weakened, the visual interference is reduced, and driving safety and driving comfort are improved. Meanwhile, the head-up display glass provided in the present disclosure may also be combined with the thermal insulation and other functions. For example, in embodiment 6, by disposing the double silver coating to the laminated glass additionally, not only can the thermal insulation performance of the head-up display glass be improved, but also the display quality of the head-up display image in the display region is not affected, thereby ensuring that the head-up display glass also has a good head-up display function.

In the present disclosure, all the embodiments listed above describe the structural composition of the head-up display glass, but do not describe the specific deposition process and parameters of the coating layer, and the specific manufacturing process and parameters of the head-up display glass. It can be understood that the above contents are well known to those ordinary skilled in the art, so the undescribed parts do not affect the scope to be protected by the present disclosure. In addition, the description of the present disclosure are preferred implementations of the present disclosure, but may not be construed as limiting the scope of the present disclosure. It may be noted that for those of ordinary skill in the art, several modifications and improvements can be made without departing from the principles of the present disclosure, and these modifications and improvements are also regarded as the protection scope of the present disclosure.

TABLE 1

Property parameters of head-up display glass in each of embodiments 1 to 6

| | | Reflectivity for the visible light, value of a, and value of b | | | Display effect (60°) | |
|---|---|---|---|---|---|---|
| Embodiments | Region | Reflectivity for visible light | a | b | Reflectivity for P-polarized light | Display quality |
| Embodiment 1 | Display region | 13.2% | −2.3 | −7.1 | 12.6% | Sharp image and no ghosting |
| | Non-display region | 8.9% | −2.0 | −2.0 | 0.3% | |
| Embodiment 2 | Display region | 13.2% | −2.3 | −7.1 | 12.6% | Sharp image and no ghosting |
| | Non-display region | 7.8% | −2.1 | 0.3 | 0.2% | |
| Embodiment 3 | Display region | 17.1% | −4.9 | −10.5 | 15.9% | Sharp image and no ghosting |
| | Non-display region | 4.8% | 0.9 | 0.3 | 1.2% | |
| Embodiment 4 | Display region | 12.0% | −3.4 | −8.5 | 12.1% | Sharp image and no ghosting |
| | Transition region | 9.7% to 12.0% | −3.4 to −3.6 | −8.5 to −6.5 | 8.8% to 12.1% | |
| | Non-display region | 9.7% | −3.8 | −6.5 | 8.8% | |
| Embodiment 5 | Display region | 26.6% | 0.4 | −1.8 | 28.6% | Sharp image and no ghosting |
| | Non-display region | 17.8% | −0.3 | −0.5 | 2.0% | |
| Embodiment 6 | Display region | 19.9% | −1.1 | −9.1 | 15.5% | Sharp image and no ghosting |
| | Non-display region | 11.9% | −5.2 | −4.7 | 3.2% | |

It can be seen from Table 1 that according to the method for manufacturing head-up display glass provided in the present disclosure, the display region with the relatively high reflectivity for the P-polarized light and the non-display region with the relatively low reflectivity for the visible light can be obtained on the surface of the laminated glass.

What is claimed is:

1. Head-up display glass comprising laminated glass, wherein the laminated glass has a first surface and a second surface opposite to the first surface, and the second surface comprises a display region and a non-display region;

a first nano-coating is disposed in the display region, the first nano-coating comprises at least one first high-refractive-index layer and at least one first low-refractive-index layer that are alternately stacked from the second surface outwards, the at least one first high-refractive-index layer each has a refractive index ranging from 1.9 to 2.7, and the at least one first low-refractive-index layer each has a refractive index ranging from 1.3 to 1.8; and the display region has a reflectivity greater than or equal to 10% for P-polarized light incident at an angle ranging from 55° to 75°, and for visible light incident at an angle ranging from 0° to 10°, a reflectivity of the non-display region is less than a reflectivity of the display region, wherein:

a second nano-coating is only disposed in the non-display region, the second nano-coating comprises at least one second high-refractive-index layer and at least one second low-refractive-index layer that are alternately stacked from the second surface outwards, the at least one second high-refractive-index layer each has a refractive index ranging from 1.9 to 2.7, and the at least one second low-refractive-index layer each has a refractive index ranging from 1.3 to 1.8; and a thickness of the second nano-coating is smaller than a thickness of the first nano-coating.

2. The head-up display glass of claim 1, wherein for the visible light incident at the angle ranging from 0° to 10°, a difference between the reflectivity of the display region and the reflectivity of the non-display region is greater than or equal to 2%.

3. The head-up display glass of claim 1, wherein for the visible light incident at the angle ranging from 0° to 10°, the reflectivity of the display region ranges from 10% to 30%, and the reflectivity of the non-display region ranges from 1% to 15%.

4. The head-up display glass of claim 1, wherein for the P-polarized light incident at the angle ranging from 55° to 75°, a reflectivity of the non-display region is less than the reflectivity of the display region.

5. The head-up display glass of claim 1, wherein the second surface further comprises a transition region located between the display region and the non-display region; and for the visible light incident at the angle ranging from 0° to 10°, a reflectivity of the transition region is greater than the reflectivity of the non-display region and less than the reflectivity of the display region.

6. The head-up display glass of claim 1, wherein the non-display region is bare laminated glass.

7. The head-up display glass of claim 1, wherein a thickness of each of the at least one second high-refractive-index layer is smaller than a thickness of each of the at least one first high-refractive-index layer.

8. The head-up display glass of claim 1, wherein a thickness of each of the at least one second low-refractive-index layer is smaller than a thickness of each of the at least one first low-refractive-index layer.

9. The head-up display glass of claim 1, wherein the at least one first low-refractive-index layer each comprises at least two first low-refractive-index sub-layers, the at least one second low-refractive-index layer each comprises at least two second low-refractive-index sub-layers, and a thickness of a first low-refractive-index sub-layer of each of the at least one first low-refractive-index layer farthest from the laminated glass is larger than a thickness of a second low-refractive-index sub-layer of each of the at least one second low-refractive-index layer farthest from the laminated glass.

10. The head-up display glass of claim 1, wherein the at least one first high-refractive-index layer each comprises at least two first high-refractive-index sub-layers, the at least one second high-refractive-index layer each comprises at least two second high-refractive-index sub-layers, and a thickness of a first high-refractive-index sub-layer of each of the at least one first high-refractive-index layer closest to the laminated glass is larger than a thickness of a second high-refractive-index sub-layer of each of the at least one second high-refractive-index layer closest to the laminated glass.

11. The head-up display glass of claim 1, wherein each of the display region and the non-display region has color values of a and b in a color space Lab, a value of a is less than or equal to 2, and a value of b is less than or equal to 2.

12. The head-up display glass of claim 1, wherein each of the display region and the non-display region has color values of a and b in a color space Lab, an absolute value of a difference between a value of a of a color of the display region and a value of a of a color of the non-display region is less than or equal to 2; and an absolute value of a difference between a value of b of the color of the display region and a value of b of the color of the non-display region is less than or equal to 2.

13. The head-up display glass of claim 1, wherein the head-up display glass further comprises one or more of an anti-fingerprint coating, a thermal insulation coating, an electric heating coating, an anti-ultraviolet (UV) coating, or an anti-fog coating.

14. The head-up display glass of claim 1, wherein the second nano-coating and the first nano-coating are different in at least one of a material of each layer, an arrangement of each layer, or a thickness of each layer.

15. The head-up display glass of claim 1, wherein the second nano-coating and the first nano-coating are the same in a material of each layer and an arrangement of each layer, and are different in a thickness of at least one layer.

16. The head-up display glass of claim 1, wherein the first nano-coating or the second nano-coating is manufactured by a coating removal method or a non-uniform coating method, and the coating removal method comprises one or more of a dry etching method, a wet etching method, or a mask method.

17. The head-up display glass of claim 1, wherein the first nano-coating is obtained by forming a second nano-coating in the display region and the non-display region first, removing the second nano-coating in the display region by a coating removal method, and then forming the first nano-coating in the display region; or the second nano-coating is obtained by forming a first nano-coating in the display region and the non-display region first, removing the first nano-coating in the non-display region by the coating removal method, and then forming the second nano-coating in the non-display region.

18. A head-up display system comprising a projection unit and head-up display glass; and the head-up display glass comprising laminated glass, wherein the laminated glass has a first surface and a second surface opposite to the first surface, and the second surface comprises a display region and a non-display region;

a first nano-coating is disposed in the display region, the first nano-coating comprises at least one first high-refractive-index layer and at least one first low-refractive-index layer that are alternately stacked from the second surface outwards, the at least one first high-refractive-index layer each has a refractive index ranging from 1.9 to 2.7, and the at least one first low-refractive-index layer each has a refractive index ranging from 1.3 to 1.8; and the display region has a reflectivity greater than or equal to 10% for P-polarized light incident at an angle ranging from 55° to 75°, and for visible light incident at an angle ranging from 0° to 10°, a reflectivity of the non-display region is less than a reflectivity of the display region; wherein the projection unit is configured to produce P-polarized light, and the P-polarized light is incident onto the display region; and a second nano-coating is only disposed in the non-display region, the second nano-coating comprises at least one second high-refractive-index layer and at least one second low-refractive-index layer that are alternately stacked from the second surface outwards, the at least one second high-refractive-index layer each has a refractive index ranging from 1.9 to 2.7, and the at least one second low-refractive-index layer each has a refractive index ranging from 1.3 to 1.8; and a thickness of the second nano-coating is smaller than a thickness of the first nano-coating.

* * * * *